US012754966B1

(12) United States Patent
Avasthi et al.

(10) Patent No.: US 12,754,966 B1
(45) Date of Patent: Oct. 6, 2026

(54) CONTEXT-AWARE GENERATIVE MODEL INGRESS SYSTEM

(71) Applicant: Amazon Technologies, Inc., Seattle, WA (US)

(72) Inventors: Prakhar Avasthi, Snohomish, WA (US); Mohanvamsi Puligundla, Bothell, WA (US); Jacob William Hart, Seattle, WA (US); Nihal Narayanan, Seattle, WA (US); Bahman Razmpa, Lynnwood, WA (US); Glenn Van Houten, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/300,163

(22) Filed: Aug. 14, 2025

(51) Int. Cl.
*G06F 16/9538* (2019.01)

(52) U.S. Cl.
CPC ................................ *G06F 16/9538* (2019.01)

(58) Field of Classification Search
None
See application file for complete search history.

(56) References Cited

U.S. PATENT DOCUMENTS

| | | | | |
|---|---|---|---|---|
| 10,706,450 | B1 * | 7/2020 | Tavernier | G06F 16/9535 |
| 11,176,210 | B1 * | 11/2021 | Miller | G06F 16/9577 |
| 2015/0324434 | A1 * | 11/2015 | Greenwood | G06F 16/00 707/722 |
| 2018/0005293 | A1 * | 1/2018 | Adams | G06Q 30/0625 |
| 2024/0069700 | A1 * | 2/2024 | Jonker | G06F 3/0484 |
| 2026/0134400 | A1 * | 5/2026 | Nelluri | G06Q 10/1053 |

FOREIGN PATENT DOCUMENTS

| | | | | |
|---|---|---|---|---|
| IN | 202541014016 A | * | 2/2025 | |
| WO | WO-2025096231 A1 | * | 5/2025 | G06F 16/288 |

OTHER PUBLICATIONS

Weerasinghe S, Zaslavsky A, Loke SW, Hassani A, Medvedev A, Abken A. Adaptive context caching for IoT-based applications: A reinforcement learning approach. Sensors. May 15, 2023;23(10):4767. (Year: 2023).*

Manchanda A, Jayaraman PP, Banerjee A, Fizza K, Zaslavsky A. Adaptive Context Monitoring Framework for Enhancing Caching Efficiency in Context Management Platforms. IEEE Access. Oct. 24, 2024;12:157612-29. (Year: 2024).*

* cited by examiner

*Primary Examiner* — Uyen T Le
(74) *Attorney, Agent, or Firm* — K&L Gates LLP

(57) ABSTRACT

Systems and methods are described herein for implementing context-aware generative model ingress operations. During a respective browsing session, a context data object comprising contextual data related to the browsing session may be updated in real-time based on various interactions with a web application, and the contextual data may be provided to a generative model as part of an input prompt. Ingress points may be placed in various locations within an interface of the web application and interactions with the ingress points may be effective to update the context data object based on various context filtering operations and the respective context associated with the ingress points. Updated contextual data may be passed to the generative model for use in generating contextual search result insights, comparisons, and/or recommendations. Such model output may be displayed via a conversation layer object displayed via the web application.

20 Claims, 8 Drawing Sheets

CONTEXT-AWARE GENERATIVE MODEL INGRESS SYSTEM

BACKGROUND

The use of generative models (e.g., language models (LMs)—sometimes referred to as "large language models" or "LLMs") is becoming ever more prevalent in a multitude of technological fields, and generative models have proven to be invaluable tools for a variety of tasks (e.g., text, image, video, and/or audio generation tasks). As such, various entities (e.g., enterprises, business, organizations) are now endeavoring to offer various generative model-based tools.

DETAILED DESCRIPTION

Figure 1:
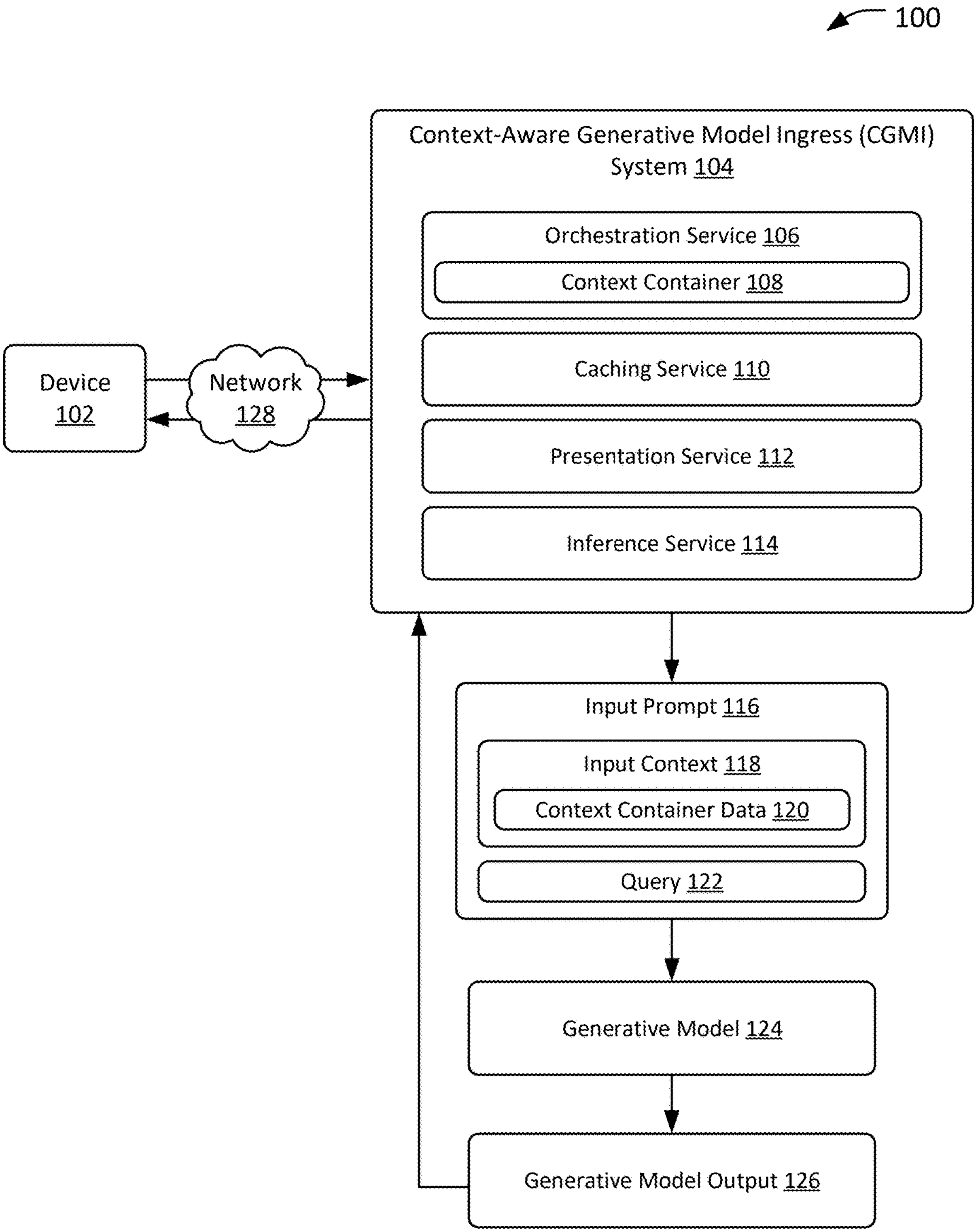
FIG. 1 is a block diagram illustrating an example architecture for implementing a context-aware generative model ingress (CGMI) system in accordance with various aspects of the present disclosure.

In the following description, reference is made to the accompanying drawings that illustrate several examples of the present disclosure. It is understood that other examples may be utilized, and various operational changes may be made without departing from the scope of the present disclosure. The following detailed description is not to be taken in a limiting sense, and the scope of the embodiments of the present invention is defined only by the claims of the issued patent.

A generative model may be generally understood as an artificial intelligence (AI) model and the use of generative models is becoming prevalent in a multitude of technological fields. For example, generative models may be configured to execute a variety of tasks such as information retrieval (e.g., question answering (QA)), text generation (e.g., text summarization, conversational text generation, search result insight generation), image and/or video generation, audio generation, and/or the like. As such, a generative model may be capable of processing and/or generating human-like text based on latent information the generative model has learned from vast amounts of training data. Generative models include "large language models" (LLMs), where the term "large" refers to the size of these models in terms of the number of parameters or weights, which are the values that the model learns during training to make predictions and generate text. Generative models may have millions, billions (or even more) parameters, which enable such models to capture complex patterns and nuances in language that, in turn, allow the models to understand and generate more natural-sounding text (relative to previous approaches). Some examples of generative models include the generative pre-trained transformer models (e.g., GPT-3, GPT-4), BERT (bidirectional encoder representations from Transformers), etc.

In a generative context, a conventional generative model may generate text that is responsive to an input context provided to the generative model by way of an input prompt. An input prompt may comprise (or programmatically reference) an input context and/or a query. In some examples, a query may be comprised of data (e.g., text data, selection data, audio data, etc.) associated with a request, question, command, instruction, and/or the like related to an input context for which a user expects various query results in response. A respective input context may include tokenized model input data related to textual data, video data, audio data, multi-page documents (e.g., large PDFs, books, manuals, or the like), a codebase comprising executable program code, and/or the like upon which a user wishes to execute a query (e.g., a QA query) or task (e.g., a summarization task, comparison task, code-debugging task, or the like).

Generative models excel at generating natural sounding text that appears as though it has been generated by a native speaker in the relevant language. In addition to fluency, generative models are able to generate detailed, relevant, and largely accurate responses to input contexts in many cases due to the large amount of latent information the generative model has learned during training. For this reason, it has become more common for enterprises across a number of industries (e.g., e-commerce, finance) to leverage generative models to facilitate various customer assistance operations. However, conventional generative model-based systems may suffer from various technical limitations and inefficiencies which may cause the generation of inaccurate, irrelevant, and/or incomplete query responses, slow system response times, and/or increased computational resource consumption. Such technical limitations and inefficiencies may cause friction in respective user experiences related to a conventional generative model-based system which may lead to increasing user drop-off rates, lower sales conversion rates, and/or the like.

Conventional generative model-based systems may introduce inherent system latency related to the upload and/or processing of various contextual data. For example, a conventional generative model-based system may require the manual upload of contextual data (e.g., text data, image data, audio data, video data) that is relevant to a particular query (e.g., a QA query) for which a user expects a response. In such examples, this may necessitate that a user manually upload contextual data during a particular session involving a respective generative model (e.g., an online browsing session, online shopping session, model-based conversation session, customer support session, etc.).

Additionally, conventional generative model-based systems may not be configured to accurately infer the specific context to which a particular query corresponds. In such cases, a respective generative model may only receive broad-level contextual data (or no contextual data at all)

pertaining to a particular session (e.g., an online browsing session, online shopping session, model-based conversation session, customer support session, etc.) and, as such, may not be equipped to generate specific and/or accurate results based on a respective query. Furthermore, conventional generative model-based systems may not be configured to shift between various contexts during a respective session as the session progresses. In such cases, a conventional generative model may attempt to generate responses to multiple queries (e.g., discrete queries related to separate topics) using a single input context which may lead to inaccurate, incomplete, and/or ambiguous query response generation.

To address these and other technical problems, a context-aware generative model ingress (CGMI) system is described herein that facilitates dynamic session awareness for a respective session (e.g., an online browsing session, online shopping session, model-based conversation session, customer support session, etc.). The CGMI system may be configured to update contextual data continually during a particular session associated with a respective computing device and/or user profile. During a respective session, the CGMI system may provide the contextual data to a respective generative model in real time (or near-real time) as the contextual data is updated so that the generative model may generate model output based on a current context of the ongoing session.

In this regard, the CGMI system may leverage an electronically-managed context data object or "context container" to manage (e.g., track, update, filter) various contextual data related to a particular session. In some examples, the contextual data managed in the context container may comprise session context data including base page data (e.g., search results page (SRP) data, details page (DP) data), search query data, search result detail data, conversation turn data, implicit signal data and/or the like related to the respective session. Additionally or alternatively, in some examples, the contextual data managed in the context container may comprise user context data including user profile data, purchase history data, browsing history data, and/or the like.

In order to update the contextual data comprised in the context container dynamically, the CGMI system may be configured to track various interactions with a software application with which the CGMI system is integrated (e.g., a web browser accessing a respective website, a mobile application, etc.). For example, The CGMI system may be configured to track which respective search results displayed on a webpage (e.g., an SRP of a retail website) have been interacted with (e.g., selected, hovered over). In such an example, various data (e.g., item data, product data, detail data) associated with the respective search results which were interacted with may be added to the context container.

Additionally or alternatively, in some examples, the CGMI system may be configured to track which respective webpages have been accessed and/or are currently being accessed during a respective session. For instance, in an example in which the CGMI system is integrated with a website (e.g., an e-commerce website, a search engine), the CGMI system may determine that a respective web browser associated with a particular computing device and/or user profile has navigated from a first webpage (e.g., an SRP generated based on a respective search query) to a second webpage (e.g., a DP associated with a particular search results returned based on the respective search query) during a respective session. The CGMI system may automatically update the context container associated with the respective session to include contextual data associated with the second webpage (e.g., the DP) at such a time as the second webpage is accessed. Additionally, in some such examples, the CGMI system may also automatically update the context container by filtering out (e.g., removing, hiding, and/or otherwise disregarding) preexisting contextual data comprised in the context container (e.g., context data related to the first webpage (e.g., the SRP)) at such a time as the second webpage is accessed.

In some examples, the CGMI system may be configured to detect an interaction with one or more ingress points (e.g., an interactive button or hyperlink) placed in various locations within a user interface of a respective software application instance. For example, an ingress point may be comprised in an interactive thumbnail object (e.g., a programmatically generated content container, sometimes referred to as a "card"), where the interactive thumbnail object corresponds directly to particular search result (e.g., an item, product, or the like retuned based on a search query). In such examples, a respective ingress point may be linked to a respective search result (e.g., a specific item or product) such that the CGMI system may be configured to retrieve various data related to the respective search result when the corresponding ingress point is selected.

In this regard, the CGMI system may be configured to update a context container to include contextual data associated with a respective search result (e.g., product level detail data) upon detecting that an ingress point corresponding to the respective search result has been selected. Additionally, the CGMI system may filter (e.g., temporarily remove, hide, or otherwise update) any existing contextual data in the context container in response to detecting a selection event associated with the respective ingress point. For example, the context container may initially comprise broad-level contextual data related to a group of search results listed on an SRP and when an ingress point related to a specific search result is selected, the existing contextual data may be filtered based on the specific search result. In some examples, a selection event associated with a respective ingress point may trigger the CGMI system to provide the updated contextual data in the context container to a respective generative model at such a time as the context container has been updated.

Additionally alternatively, in some examples, respective ingress points may be associated with a particular webpage of a respective website (e.g., a DP associated with a particular item or product, an SRP, a homepage, etc.), or a with a specific sub-group of detailed data associated with the particular webpage (e.g., customer review data). Further details related to such ingress points will be described in greater detail herein below.

In various examples, the CGMI system may be configured to facilitate the pre-generation of one or more suggested queries and corresponding query response data related to the one or more suggested queries by the generative model. A suggested query may be a suggested question or request related to a particular subject, product, service, and/or the like. For example, a suggested query may be related to a frequently asked question, or a question composed to generate various model-based insights or recommendations. In this regard, the CGMI system may be configured to provide contextual data comprised in a context container to a generative model as part of one or more input prompts formulated to generate one or more suggested queries and corresponding suggested query response data (e.g., model generated question answers, insights, etc.). In some examples, the CGMI system may store the one or more suggested queries and the corresponding suggested query response data in a memory cache for efficient retrieval during the session.

Additionally, the CGMI system may be configured to manage a conversation layer object displayed over a respective user interface (e.g., a user interface associated with an SRP or DP of a respective website). The conversation layer object may be an interactive chat window configured to facilitate communication between a respective computing device and a generative model which has been provided with contextual data related to a respective session. As such, the conversation layer object may be configured to facilitate a series of conversational exchanges, or "turns," between the respective computing device and the generative model. In some examples, a detected selection interaction with a respective ingress point may trigger the display (e.g., the opening or expansion) of the conversation layer object over a respective user interface.

Furthermore, the CGMI system may update the configuration of the conversation layer object based on the evolving context of a respective session, thereby indicating the current context being utilized by the generative model to generate responses. For example, when an ingress point associated with a respective search result (e.g., a particular product) is selected, the CGMI system may cause the display of an interactive display element (e.g., an interactive button, hyperlink, etc.), or "filter pill," associated with the respective search result within the conversation layer object. In some examples, the filter pill may describe the corresponding search result via a text summary (e.g., a descriptive title) and/or an image (e.g., a thumbnail image representing the search result), thus indicating a current context within which the computing device and generative model are communicating.

In some examples, the CGMI system may detect a selection event with respect to a dismissal affordance comprised within the filter pill (e.g., an "X" button) indicating a request to remove and/or revert the current context associated with the respective search result. In such cases, the CGMI system may be configured to update the context container to revert to a previous context and/or a broader context (e.g., a webpage-level context) which may then be provided to the generative model. Furthermore, in some examples, the CGMI system may configure (or reconfigure) the conversation layer object based on the navigation between various webpages during a respective session. In this manner, the CGMI system may dynamically switch the context provided to a generative model in real time (or near-real time) throughout a respective session.

Thus, the CGMI system provides a number of technical benefits and improvements over conventional generative model-based systems. For example, the CGMI system may reduce consumption of computational resources while facilitating efficient execution of various sessions (e.g., online browsing sessions, online shopping sessions, model-based conversation sessions, customer support sessions, etc.). For example, the CGMI system may reduce the overall number of selection events (e.g., mouse clicks or hovers) and/or steps that a user takes to complete a respective session (e.g., an online shopping session). Such reduction in selection events and/or steps directly corresponds to a reduction in computational resource consumption as the various related processing operations associated with said selection events and/or steps will not be executed by a respective computing system. Additionally, the CGMI system may reduce computational resource consumption by reducing navigation between respective SRPs and one or more related DPs during a respective session. This may be achieved as the contextual data related to a particular DP associated with a particular search result (e.g., a particular product) may be stored in a context container associated with the respective session and provided to the generative model without requiring a software application (e.g., a web browser) to navigate from a corresponding SRP to the particular DP.

Furthermore, the CGMI system may reduce friction in a user experience associated with a respective session by eliminating unnecessary page navigation, thereby reducing user drop-off rates and/or increasing sales conversions. Additionally in this regard, the CGMI system may be configured to provide personalized model output (e.g., personalized suggested queries and/or query response data, personalized search results and/or suggestions, and/or personalized insights related to a current context of a respective session) for a particular user based on the current context of an ongoing session.

It will be appreciated that although many examples described herein relate to an online retail environment, the CGMI techniques described herein may be applicable in other technical contexts such as online search executed by a search engine (e.g., online search outside of a retail context), IT support, AI assistant enabled-device technology, AI-supported scientific research, and more.

Machine learning (ML) techniques, such as those described herein, are often used to form predictions, solve problems, recognize objects in image data for classification, etc. In various examples, ML models may perform better than rule-based systems and may be more adaptable as ML models may be improved over time by retraining the models as more data becomes available. Accordingly, ML techniques are often adaptive to changing conditions. Deep learning algorithms, such as neural networks, are often used to detect patterns in data and/or perform tasks.

Generally, in ML models, such as neural networks, parameters control activations in neurons (or nodes) within layers of the ML models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in ML models, such as neural networks, after initialization, annotated training data may be used to generate a cost or "loss" function that describes the difference between expected output of the ML model and actual output. The parameters (e.g., weights and/or biases) of the ML model may be updated to minimize (or maximize) the cost. For example, the ML model may use a gradient descent (or ascent) algorithm to incrementally adjust the weights to cause the most rapid decrease (or increase) to the output of the loss function. The method of updating the parameters of the ML model is often referred to as back propagation.

Transformer models are ML models that include an encoder network and a decoder network. Generative models are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens).

The output data may be used to perform task-specific functions and/or generate a natural language response to the input (depending on the specific model being employed). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs and contain residual connections and layer normalization steps.

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i=x_i W_Q$, a key vector $k_i=x_i W_K$, and a value vector $v_i=x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}\ (Q, K, V) = \mathit{softmax}\left(\frac{QK^T}{\sqrt{d_k}}\right)V.$$

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders. The first encoder takes position information and embeddings of the input data as its input, rather than encodings. The position information is used by the transformer to make use of the order of the input data. In various examples described herein, the position embedding may describe an order of a sequence of words.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

It will be appreciated that the scope of the present disclosure encompasses many potential examples in addition to those described above, some of which will be described in further detail below. Now that some advantages associated with example implementations described herein have been described above in contrast with traditional systems, examples of the architecture and componentry of various examples will now be described below with reference to FIGS. 1-2, 3A-3C, and 4-6.

FIG. 1 is a block diagram illustrating an example architecture 100 that may be configured for implementing the various CGMI processes as described herein. In some examples, the various CGMI processes may be implemented in conjunction with a generative model (e.g., generative model 124) associated with a remote system configured in communication with a computing device (e.g., device 102) or other computing device that may receive input (e.g., text, speech, selection indications, etc.). As shown, the generative model 124 may be configured to generate generative model output 126 (e.g., generative output such as text, images, videos, audio, and/or a combination thereof) in response to processing an input prompt 116. In this regard, the generative model 124 may be configured to receive multimodal data as input (e.g., multimodal data comprised in an input prompt 116) and/or generate multimodal output (e.g., generative model output 126) in response.

In some examples, a user may interact with the CGMI system 104 and/or the generative model 124 via a computing device (e.g., a device 102) by way of a network 128 (e.g., a telecommunications network (e.g., 5G network), wide area network (WAN), local area network (LAN), wireless Internet network, near-field communication (NFC) network, and/or the like capable of facilitating remote network communications between two or more computing devices). In some such examples, a user may interact with the CGMI system 104 via a software application instance (e.g., a web-based application). In various examples, the software application instance associated with the generative model 124 may be installed and/or downloaded to a computing device (e.g., a device 102) and may present one or more user interface configurations via the software application instance.

For example, the software application instance associated with the CGMI system 104 may be configured to cause display of various interactive display elements to the user to facilitate the submission of various input (e.g., selection input, text input, audio input, etc.) that may be included as part of an input prompt 116 provided to a generative model (e.g., generative model 124). In various examples, the interactive display elements may be configured as one or more interactive text fields, buttons, selectable images, hyperlinks, radio buttons, sliders, embedded multimedia modules, maps, charts, graphs, prompts, notifications, banners, instructions, and/or the like configured to initiate execution of one or more commands (e.g., executable software instructions) designed to facilitate the capture of one or more portions of input data. In this regard, a user may be enabled to interact with the CGMI system 104 and/or the generative model 124 via a number of technological platforms and in various ways. For example, the user may interact with the CGMI system 104 and/or the generative model 124 via a software application instance running on a computing device (e.g., a smartphone, laptop, desktop computer), a web browser extension (e.g., a plugin, auxiliary software application embedded in the web browser), an embedded computing device (e.g., a central computing device in an automobile), a smart home device, and/or the like.

As such, a respective user may be enabled to interact with the CGMI system 104 and/or the generative model 124 in a number of ways including conversational speech (e.g., a natural language request), text-based communication (e.g., direct text input), a user selection indication (e.g., an interaction with a user interface), and/or via various body gestures. In this regard, a device 102 may be a known computing device in the art such as a desktop computer, laptop computer, tablet computer, smart home device (e.g., virtual assistant device), a home automation system device, Internet of Things (IoT) device (e.g., network-capable appliance), mobile device (e.g., a smartphone), and/or the like. Additionally, in various examples, the software application instance associated with the CGMI system 104 and/or may be configured to enable a computing device (e.g., device 102) to access a software application framework related to a respective enterprise by, for example, granting (e.g., transmitting, enabling, toggling, configuring, etc.) one or more access permissions to the computing device, where the one or more access permissions enable the computing device to access the software application framework associated with the enterprise.

In some examples, the CGMI system 104 may comprise, manage, and/or otherwise integrate with one or more services. As used herein, the term "service" may refer to one or more computing devices comprising various processing elements configured to execute non-transitory computer-readable and computer-executable instructions that are effective to achieve one or more specific tasks. In some examples, multiple services may execute various operations using common hardware, firmware, and/or software. Additionally or alternatively, in some examples, a respective service may execute various operations using dedicated hardware, firmware, and/or software. In various examples, the one or more services associated with the CGMI system 104 may be remote, web-based services and may be configured to communicate with the various components of the architecture 100 via the network 128. For example, the one or more services may be configured to execute various application programming interface (API) calls to transmit/retrieve various data, and/or to facilitate the execution of various operations associated with the methods described herein.

As shown in FIG. 1, the CGMI system 104 may comprise an orchestration service 106, a caching service 110, a presentation service 112, and/or an inference service 114.

In some examples, the orchestration service 106 may be configured to monitor a particular session (e.g., an online browsing session, online shopping session, model-based conversation session, customer support session, etc.) associated with a respective computing device (e.g., device 102). The orchestration service 106 may be configured to track various actions of the computing device (e.g., device 102) as the device navigates a website or web-based application in order to determine various contextual data to be provided to the generative model 124. For example, the orchestration service 106 may be configured to track which respective search results displayed on a webpage (e.g., an SRP of a retail website) have been interacted with (e.g., selected, hovered over). In such an example, the orchestration service 106 may retrieve and/or reference various data (e.g., item data, product data, detail data) associated with the respective search results which were interacted with and add the data to the context container 108.

In some examples, the orchestration service 106 may be configured to track which respective webpages have been accessed and/or are currently being accessed during a respective session. For instance, in an example in which the CGMI system 104 is integrated with a website (e.g., an e-commerce website, a search engine), the orchestration service 106 may determine that a respective web browser associated with a particular computing device and/or user profile has navigated from a first webpage (e.g., an SRP generated based on a respective search query) to a second webpage (e.g., a DP associated with a particular search results returned based on the respective search query) during a respective session. The orchestration service 106 may automatically update the context container 108 associated with the respective session to include contextual data associated with the second webpage (e.g., the DP) at such a time as the second webpage is accessed. Additionally, in some such examples, the orchestration service 106 may also automatically update the context container 108 by filtering out (e.g., removing, hiding, and/or otherwise disregarding) preexisting contextual data comprised in the context container (e.g., context data related to the first webpage (e.g., the SRP)) at such a time as the second webpage is accessed.

Additionally, the orchestration service 106 may be configured to detect an interaction with one or more ingress points (e.g., an interactive button or hyperlink) placed in various locations within a user interface of a respective software application instance. The orchestration service 106 may be configured to update the context container 108 to include contextual data associated with a respective search result (e.g., product level detail data) upon detecting that an ingress point corresponding to the respective search result has been selected. Additionally, the orchestration service 106 may execute one or more filtering operations to temporarily remove, hide, disregard, or otherwise update any existing context container data 120 in the context container 108 in response to detecting a selection event associated with the respective ingress point. In some examples, a selection event associated with a respective ingress point may trigger the orchestration service 106 to provide updated context container data 120 comprised in the context container 108 to the generative model 124 at such a time as the context container 108 has been updated. The various types of contextual data managed by the orchestration service 106 within the context container 108 is described in greater detail herein with reference to FIG. 2.

Additionally, in some examples, the orchestration service 106 may operate in conjunction with the generative model 124 to place one or more ingress points in one or more respective locations within a particular webpage (e.g., an SRP, DP, or the like). For example, the generative model 124 may be provided with various base page data (e.g., page element data, page metadata, etc.) associated with a particular webpage and prompted to infer one or more optimal locations in which to place respective ingress points. For instance, if a webpage (e.g., an SRP) comprises a set of interactive thumbnail objects related to respective search results, the generative model 124 may determine that an ingress point should be placed within each respective interactive thumbnail object proximate to a respective description or interactive display element (e.g., an interactive button) associated with a respective search result.

As another example, the generative model 124 may be configured to identify one or more locations within a particular webpage (e.g., a DP) that may have a highest probability of being viewed during a respective session. For example, the generative model 124 may identify one or more page elements comprised in the base page data (e.g., headings, rating widgets, sections/divisions, buttons, etc.) that may be associated with prominent locations within a respective webpage. As such, the generative model 124 may indicate that an ingress point should be placed proximate to a respective prominent location (e.g., near a main heading associated with the webpage, near a customer review section, near a price associated with a product, etc.). In such examples, the orchestration service 106 may be configured to cause placement of one or more ingress points in one or more respective prominent locations identified by the generative model 124.

As such, the orchestration service 106 may be configured to facilitate the update of one or more portions of executable program code (e.g., HTML, XML, etc.) associated with a particular webpage such that one or more ingress points are displayed on the particular webpage. Furthermore, the orchestration service 106 may be configured to link a respective ingress point to the appropriate contextual data indicated by the placement of the respective ingress point. For example, if the orchestration service 106 places an ingress point within an interactive thumbnail object associated with a respective search result, the orchestration service 106 may link, point to, retrieve, and/or otherwise reference the contextual data associated with the respective search result (e.g., base page data, search result detail data, etc.) upon detection of a selection event associated with the ingress point. In this manner, the orchestration service 106 may be configured to update a context container 108 associated with a particular session based on a detected interaction with an ingress point which the orchestration service 106 has placed in conjunction with the generative model 124.

Additionally, the orchestration service 106 may be configured to manage a conversation layer object (e.g., an interactive chat window) that is displayed over a respective user interface (e.g., a user interface associated with an SRP or DP of a respective website). The orchestration service 106 may be configured to receive/retrieve various query data (e.g., related to a query 122) from the conversation layer object, and provide the query data to the inference service 114 for inclusion in a respective input prompt 116. Furthermore, the orchestration service 106 may be configured to receive/retrieve various query response data (e.g., generative model output 126) from the generative model 124 by way of the inference service 114 and cause display of the query response data via the conversation layer object. In this regard, the orchestration service 106 may be configured to leverage one or more of the caching service 110, the presentation service 112, and/or the inference service 114 to facilitate the execution of the various methods described herein.

The caching service 110 may be configured to manage one or more memory locations and/or storage devices (e.g., a memory cache) configured to store various generative model output 126. For example, as described herein, the generative model 124 may be prompted to pre-generate one or more suggested queries (e.g., query 122) and corresponding suggested query response data (e.g., generative model output 126) related to the one or more suggested queries. A suggested query may be a suggested question or request related to a particular subject, product, service, and/or the like associated with a current session. For example, a suggested query may be related to a frequently asked question, or a question composed to generate various model-based insights or recommendations related to one or more search results displayed on a respective SRP or DP.

In this regard, the orchestration service 106 may be configured to provide contextual data comprised in a context container 108 to a generative model 124 as part of one or more input prompts formulated to generate one or more suggested queries and corresponding suggested query response data (e.g., model generated question answers, insights, etc.). In some examples, the caching service 110 may store the one or more suggested queries and the corresponding suggested query response data in a memory cache for efficient retrieval during the session. If an interactive display element (e.g., an interactive button) associated with a suggested query comprised in a respective conversation layer object is selected by a computing device (e.g., device 102), the orchestration service 106 may leverage the caching service 110 to fetch the corresponding pre-generated suggested query response data from the memory cache.

Additionally, the orchestration service 106 may detect a text entry event in which a user manually enters a query (e.g., a query 122) via a text field comprised in a conversation layer object. In such an example, the orchestration service 106 may prompt the caching service 110 to determine whether any pre-generated suggested query response data related to the current session context (e.g., context container data 120) that matches the query exists in the memory cache. If any pre-generated suggested query response data matches the manually-entered query (e.g., query 122), the caching service 110 may return pre-generated suggested query response data to the orchestration service 106 for rendering in a respective conversation layer object. In such an example, if no pre-generated suggested query response data related to the current session context (e.g., context container data 120) matches the manually-entered query (e.g., query 122), the caching service 110 may be configured to prompt the generative model 124 to generate a response based on the manually-entered query and the context container data 120.

The presentation service 112 may be configured to transform various data (e.g., generative model output 126) from a first data format to a second data format. In some examples, one or more portions of respective generative model output 126 may be configured in a first data format (e.g., as a JSON object). The presentation service 112 may be configured to transform the one or more portions of respective generative model output 126 into a second data format (e.g., XML, HTML, and/or the like). In such examples, after the presentation service 112 transforms the generative model output 126 into a second data format, the presentation service 112 may provide the generative model output 126 to the orchestration service 106 for presentation in a respective conversation layer object. Similarly, in some examples, various suggested query data and/or suggested query response data may be stored in the memory cache in a first data format (e.g., a JSON format). If the caching service 110 fetches such suggested query data and/or suggested query response data from the memory cache, the caching service 110 may provide the suggested query data and/or suggested query response data to the presentation service 112 for transformation into a second data format (e.g., XML, HTML, or the like).

The inference service 114 may be configured as an interface between the CGMI system 104 and the generative model 124. In some examples, the inference service 114 may be configured to generate a respective input prompt 116 comprising context container data 120 and provide the respective input prompt to the generative model 124. In some such examples, the orchestration service 106 may leverage the inference service 114 to generate a new (or updated) input prompt 116 comprising context container data 120 upon detecting one or more events during a respective session. For example, the inference service 114 may be prompted to generate a new (or updated) input prompt 116 based on one or more of an ingress point selection event, suggest query selection event, webpage navigation event, conversation layer turn event (e.g., a manual query submission event), and/or the like that has been detected by the orchestration service 106. Additionally, the inference service 114 may be configured to receive/retrieve various generative model output 126 from the generative model 124 and pass the generative model output 126 to one or more components of the CGMI system 104 for further processing.

As shown in FIG. 1, the generative model 124 may be configured to receive an input prompt 116 from the CGMI system 104. An input prompt 116 may comprise an input context (e.g., input context 118) and/or a query (e.g., query 122). In various examples, a query (e.g., query 122) may be captured by one or more input components of a respective computing device (e.g., device 102) such a microphone, touchscreen, and/or various input components (e.g., input/output components). In some examples, a query (e.g., query 122) may be comprised of text data and/or selection data (e.g., user interface interaction data) associated with a query (e.g., a request, question, command, instruction) for which a user expects various query results (e.g., generative model output 126) in response. Additionally or alternatively, a query (e.g., query 122) may be comprised of audio data (e.g., utterances, natural language requests, human speech) associated with a query (e.g., a request, question, command, instruction) for which a user expects various query results in response. In some examples, a query (e.g., query 122) may correspond to a suggested query that has been previously generated by the generative model 124 based on context container data 120.

A query (e.g., query 122) may serve as an input into the generative model 124 and may be a request to perform some task. The specific task may vary. For example, a query may be a request for data about one or more products and/or services offered by a respective enterprise, a request to summarize or answer a question about corresponding input context data (e.g., input context 118), a request to compare information, a request for data about a particular subject or knowledge domain, and/or the like.

For example, a computing device (e.g., device 102) may provide an input prompt 116 comprising a query (e.g., query 122) associated with a respective SRP displaying a plurality of products during a session (e.g., an online shopping session) such as "Which unit has the best warranty?" to the generative model 124, where the unit referenced by the query may be associated with a plurality of products displayed on an SRP. In such an example, a corresponding input context (e.g., input context 118) associated with the input prompt may comprise contextual data related to the SRP displaying the plurality of products which the query is referring to. As described herein, in some examples, a query (e.g., query 122) may be a suggested query generated by a generative model (e.g., generative model 124) based on one or more portions of context container data 120. In such examples, the orchestration service 106 may be configured to cause display of an interactive display element associated with the query (e.g., an interactive button) within a conversation layer object (e.g., an interactive chat window) associated with a particular website.

In some examples, the software application instance associated with the generative model 124 may be configured to enable a user to upload data (e.g., text data, image data, audio data, etc.) to be used as part of an input context (e.g., input context 118). In some such examples, both an input context (e.g., input context 118) and a query (e.g., query 122) may be received by the generative model 124 a single input prompt 116. Additionally or alternatively, the software application instance associated with the generative model 124 may be configured to enable a user to point to (e.g., link to, programmatically reference) an input context (e.g., input context 118). For example, the generative model 124 may be configured to fetch one or more portions of data from an external data source to be used as a respective input context (e.g., input context 118) based on an indication (e.g., a selection, command, or search instruction) received from a respective computing device (e.g., device 102).

In some examples, the software application instance associated with the CGMI system 104 may configure an interface (e.g., a conversation layer object) between the generative model 124 and a respective computing device (e.g., device 102). As such, the generative model 124 may be configured to receive and/or retrieve an input prompt 116 associated with a respective computing device (e.g., device 102) in order to determine a query (e.g., query 122) by processing information associated with the input prompt 116. In this regard, the generative model 124 may comprise and/or leverage various natural language processing computing component(s) (either locally or remotely) for further natural language processing (e.g., ASR, NLU, generative model inference, etc.) in order to process various input prompts, utterances, tokenized input data and/or the like.

In some examples, the generative model 124 may be configured to enforce various predetermined constraints during the execution of the various generative model tasks. The predetermined constraints may be associated with various generative model guardrails configured to ensure that any generative model output 126 generated as a result of executing one or more generative model tasks are appropriate, unbiased, non-sensitive, and/or free of misinformation. For example, various generative model guardrails enforced by the generative model 124 may ensure that any generative model output 126 returned to a respective computing device (e.g., device 102) do not exhibit any social bias (e.g., bias towards a particular race or ethnicity, bias towards a particular gender or gender identity), product bias (e.g., bias towards a particular brand, company, service, product, institution), and/or the like. Additionally, in some examples, the various generative model guardrails may ensure that any external data used to generate query results is validated and/or sourced only from trusted domains, datastores, and/or systems. In this regard, if one or more query results violate one or more predetermined constraints (e.g., generative model constraints), the generative model 124 may be configured to remove, omit, and/or otherwise preclude the one or more query results that violate the one or more predetermined constraints from being included in respective generative model output (e.g., generative model output 126).

In various examples, generative model guardrails may be defined by an enterprise with which the generative model 124 is associated and configured to ensure adherence to various data privacy standards and/or to ensure users are not exposed to harmful, biased, and/or false information, search results, media, and/or the like. For example, various generative model guardrails enforced by the generative model 124 may ensure that various graphic content (e.g., violent media, inappropriate and/or uncouth content) is not presented to a user. Additionally or alternatively, the various predetermined constraints enforced by the generative model 124 may be configured to ensure the relevance of any query results. For example, the predetermined constraints may ensure that any returned query results are topically relevant (e.g., associated with data in which the user is interested in such as a particular input context 118).

In some examples, the generative model output 126 may comprise query results generated in response to queries (e.g., query 122) related to input contexts (e.g., input context 118) comprised in an input prompt 116 received and/or referenced from a computing device (e.g., device 102). In some examples, the generative model output 126 may comprise multimodal query results organized in an output data object (e.g., an electronically managed data object), where the query results may be digital content in various formats including various text data formats (e.g., a JSON format), audio data formats, image data formats, and/or video data formats. In some examples, the generative model 124 may be configured to determine an order or sequence of relevant query results for an output data object related to generative model output 126 based in part on one or more user preferences.

In some examples, generative model output (e.g., generative model output 126) may be configured as an electronically managed data structure configured to comprise various data related to the results and/or status of the execution of a respective query (e.g., query 122) with respect to a particular input context (e.g., input context 118). As such, in some examples, the generative model 124 may process (e.g., analyze, recombine, aggregate, organize) the various outputs (e.g., status outputs, query results, summarizations, output tokens, and/or the like) generated during the execution of a respective query (e.g., query 122) and provide generative model output 126 that is representative of an overall result (e.g., a data object comprising one or more query results related to question answers, insights, recommendations, input context summarization, predictions, inferences, generative prompts, and/or the like) to one or more devices (e.g., device 102).

In some examples, generative model output (e.g., generative model output 126) may be configured to be rendered on a user interface associated with a computing device (e.g., device 102), such as in conversation layer object (e.g., an interactive chat window). In some examples, the user interface may be associated with a software application instance integrated with the CGMI system 104. As described herein, the generative model output 126 may comprise various query results generated in response to the execution of a respective generative model task by the generative model 124 with respect to a respective input prompt (e.g., an input prompt 116 comprising an input context 118 and/or a query 122). In some examples, the configuration of generative model output (e.g., generative model output 126) may be determined by the generative model 124. Various generative model output (e.g., generative model output 126) generated based on the execution of a respective query (e.g., query 122) may include one or more of a first query result configured as a portion of text, a second query result configured as a configured as an image, a third query result configured as an audio file, and/or a fourth query result configured as a video file.

For example, a first query result configured as a portion of text may comprise one or more interactive display elements (e.g., hyperlinks) that a user may access based on a selection indication (e.g., a finger press, mouse click). In some examples, the first query result configured as a portion of text may be a human readable summarization (e.g., a title, category, description) of an initial input context (e.g., input context 118). In some examples, the first query result configured as a portion of text may be an ordered list, a series of paragraphs, and/or the like and may comprise one or more hyperlinks configured to reference one or more portions of external data which may be relevant to the first query result and/or the corresponding query (e.g., query 122). Additionally or alternatively, the second query result configured as a configured as an image may be interactive (e.g., may link to a webpage such as a DP related to a particular product, may be zoomable). Additionally or alternatively, the third query result configured as an audio file may comprise audio data pertaining to the pertinent information of the corresponding query (e.g., query 122) and may play automatically once the computing device (e.g., device 102) renders the one or more query results associated with the generative model output 126 (e.g., within a respective conversation layer object). Additionally or alternatively, the fourth query result configured as a video file may comprise video data pertaining to the pertinent information of the corresponding query (e.g., query 122) and may be playable by the computing device (e.g., device 102) via a respective user interface.

Figure 2:
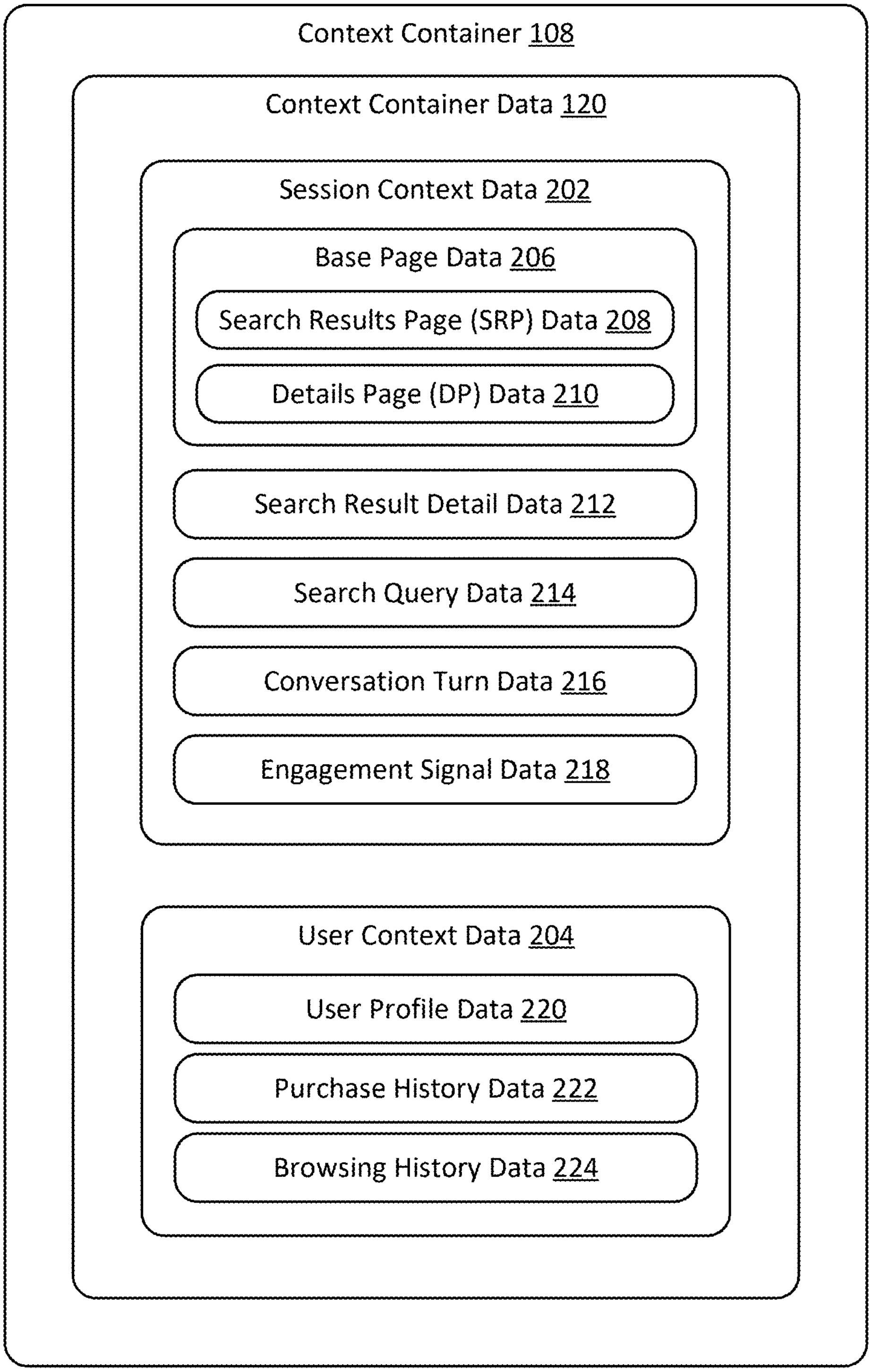
FIG. 2 illustrates an overview of an example context container utilized to dynamically update contextual data in accordance with various aspects of the present disclosure.

FIG. 2 illustrates example context container data 120 that may be comprised in a context container 108 managed by the orchestration service 106 of the CGMI system 104. As described herein, the context container data 120 may correspond to a respective session (e.g., an online browsing session, online shopping session, model-based conversation session, customer support session, etc.) associated with a respective computing device (e.g., device 102) and/or user profile. As shown, the context container data 120 may comprise one or more of session context data 202 and/or user context data 204.

The session context data 202 may comprise one or more of base page data 206, search result detail data 212, search query data 214, conversation turn data 216, and/or engagement signal data 218 related to a respective session.

In some examples, base page data 206 may represent a current webpage or view associated with a software application instance which a computing device (e.g., device 102) is currently referencing. Base page data 206 may describe a particular webpage associated with a website that a web-based application has navigated to and may comprise and/or reference various data (e.g., metadata, HTML data, XML data, etc.) associated with one or more features associated with the particular webpage. Base page data 206 may also comprise and/or reference various enterprise data (e.g., business data, product data, service data, legal data, etc.) associated with a respective enterprise that is stored in one or more storage devices associated the respective enterprise. Additionally or alternatively, base page data 206 may also comprise one or more of SRP data 208 and/or DP data 210.

In some examples, SRP data 208 may comprise data related to one or more search results that have been retrieved based on a respective search query and displayed on a respective SRP. For example, SRP data 208 may comprise data related to one or more search results (e.g., products and/or services offered by an enterprise) that have been provided to a computing device (e.g., device 102) based on a search query received from the computing device. The SRP data 208 may comprise and/or reference one or more of metadata, text data, image data, audio data, video, and/or the like associated with the one or more search results.

The DP data 210 may comprise and/or reference one or more of metadata, text data, image data, audio data, video, and/or the like associated with a DP related to a respective search result (e.g., a specific product and/or service). In some examples, DP data 210 may comprise descriptive data indicating one or more of details related to a DP associated with a respective search result. In some examples, DP data 210 may comprise and/or reference various search result detail data 212 associated with a particular search result (e.g., a particular product, item, service, etc.). Search result detail data 212 may comprise and/or reference one or more of price data, product feature data, product composition data (e.g., data related to a product's materials, ingredients, manufacturing, etc.), user rating data, user review data, comparison data (e.g., data referencing products or services that are similar to the search result described by the DP in view), warranty information, and/or the like.

Search query data 214 may comprise and/or reference a respective search query (e.g., a natural language request, search terms) used to retrieve and/or provide various search result data comprised in respective base page data 206.

Conversation turn data 216 may comprise and/or reference one or more turns (e.g., communication exchanges) between a respective computing device (e.g., device 102) and/or user profile and a respective generative model (e.g., generative model 124) associated with the CGMI system 104. In some examples, conversation turn data 216 may comprise and/or reference one or more queries (e.g., manually-entered natural language queries, selected suggested queries, etc.) submitted by a respective computing device (e.g., device 102) and/or user profile, and/or the corresponding query response data (e.g., generative model output 126, suggested query response data) generated by a generative model (e.g., generative model 124) in response to the one or more queries. Furthermore, in some examples, conversation turn data 216 may be utilized by the CGMI system 104 to manage (e.g., initiate, track, conclude, etc.) a particular session associated with a respective computing device (e.g., device 102) and/or user profile. In some examples, a respective session may correspond to a predetermined number of turns (e.g., five turns, ten turns, or any suitable number of turns) between a computing device (e.g., device 102) and a respective generative model (e.g., generative model 124). As such, in various examples, the CGMI system 104 may be configured to limit the context container data 120 to comprise only contextual data (e.g., session context data 202) which pertains to the predetermined number of turns of a respective session and may discard historical contextual data as more turns are executed.

Engagement signal data 218 may comprise and/or reference various explicit and/or implicit user interactions (e.g., user inputs) executed with respect to a software application integrated with the CGMI system 104. For example, engagement signal data 218 may comprise and/or reference various user engagement data and may describe an amount of time a mouse pointer has hovered over a respective interactive display element (e.g., an interactive thumbnail object associated with a particular product) and/or an amount of time a particular interactive display element has remained in view on a computing device (e.g., device 102). Additionally or alternatively, engagement signal data 218 may indicate an amount of time a particular base page (e.g., a respective SRP or DP) has remained in view on a computing device. Additionally or alternatively, engagement signal data 218 may indicate which interactive display elements associated with a respective base page have been selected (e.g., clicked, toggled), typed into (e.g., such as in a text field), and/or otherwise manipulated by an input device associated with a computing device (e.g., device 102).

As shown, in some examples, the context container data 120 managed in a context container 108 may comprise and/or refence user context data 204 including user profile data 220, purchase history data 222, browsing history data 224, and/or the like. User profile data 220 may comprise and/or reference data related to a particular user profile, user account, and/or individual associated with a particular software application framework with which the CGMI system 104 is integrated. User profile data 220 may comprise one or more of contact information, payment information, personally identifiable information (PII), and/or the like associated with a particular user profile, user account, and/or individual. Additionally, user profile data 220 may indicate a user type associated with the corresponding user profile. A user type may be a classification (e.g., generated by the generative model 124) that indicates a personality type, behavior type, career field, lifestyle, and/or the like associated with a corresponding user profile.

Purchase history data 222 may comprise and/or reference data related to one or more transactions executed on behalf of a respective user profile, user account, and/or individual. In some examples, purchase history data 222 may indicate one or more portions of search result detail data 212 associated with a product and/or service which a respective user profile has previously purchased.

Browsing history data 224 may comprise and/or reference data related to one or more sessions (e.g., current and/or historical online browsing sessions, online shopping sessions, model-based conversation sessions, customer support sessions, etc.) associated with a respective user profile, user account, and/or individual. In some examples, browsing history data 224 may comprise and/or reference a current and/or previous navigation of one or more webpages associated with a respective website integrated with the CGMI system 104.

As described herein, context container data 120 may be provided as part of one or more input prompts (e.g., input prompt 116) provided to a respective generative model (e.g., generative model 124). User context data 204 comprised in the context container data 120 may enable the generative model (e.g., generative model 124) to generate personalized responses for a particular user and/or may enable the generative model to provide generative model output (e.g., generative model output 126, such as a suggested query) that has an increased relevance to the particular user relative to conventional model-based responses.

Figure 3A:
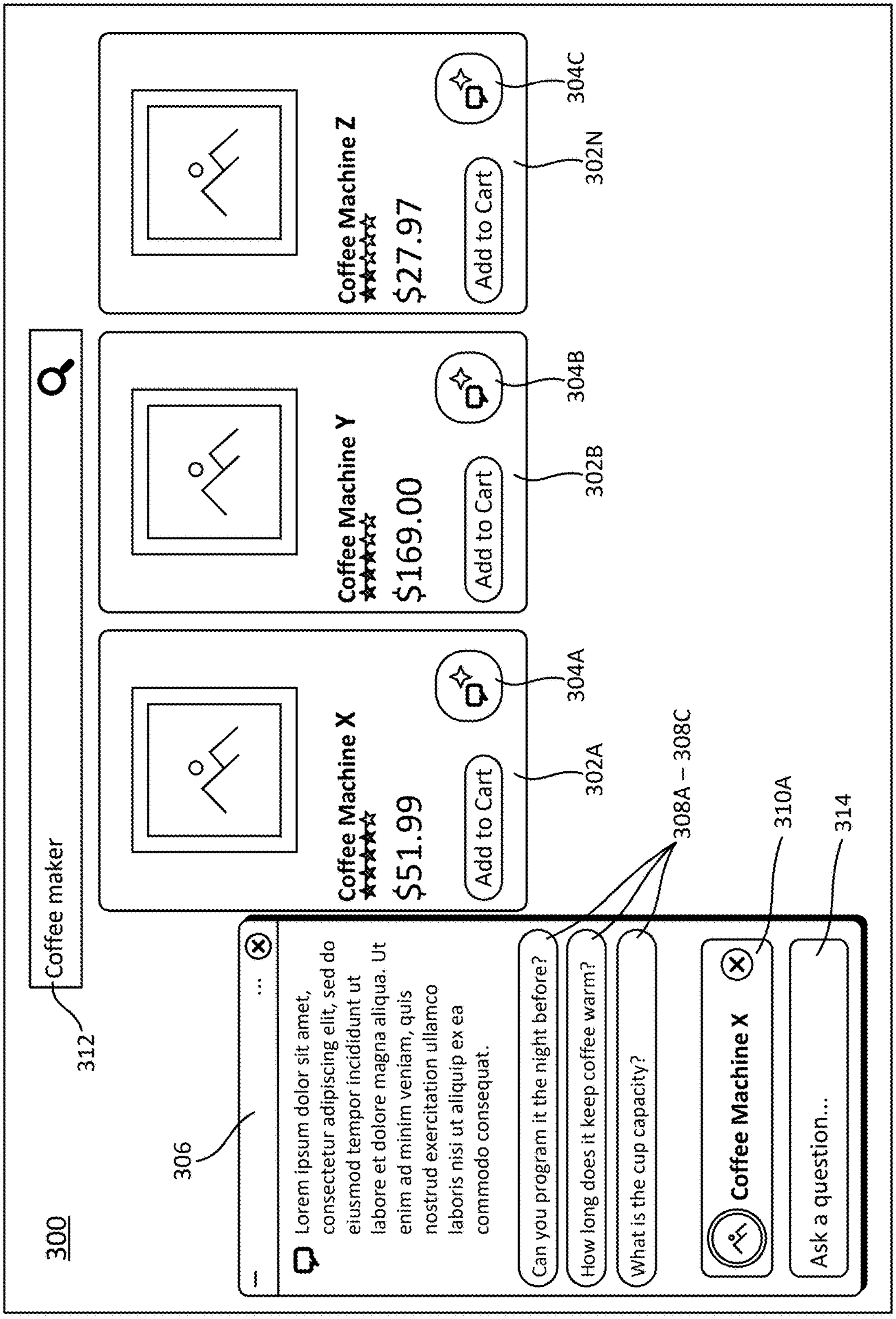
FIG. 3A illustrates an example user interface of a search results page (SRP) of a website that is configured to leverage a CGMI system in accordance with various aspects of the present disclosure.

FIG. 3A illustrates an example user interface 300 of an SRP of a website that is configured to leverage the CGMI system 104. In this example, the SRP is associated with a website related to an e-commerce platform associated with an enterprise that sells various products (e.g., home goods, electronics, apparel, etc.). As shown, the SRP is displaying a set of search results returned based on a search query 312 (e.g., "coffee maker") during a respective session. Specifically, the SRP is displaying a set of interactive thumbnail objects 302A-302N, where each of the interactive thumbnail objects 302A-302N is associated with a specific search result (e.g., a specific product) returned based on the search query 312. A respective interactive thumbnail object (e.g., interactive thumbnail object 302A) may be configured to comprise one or more interactive display elements (e.g., buttons, hyperlinks, images, etc.) associated with the respective search result (e.g., "Coffee Machine X") and/or the website related to the e-commerce platform.

As described herein, one or more ingress points 304A-304N (e.g., configured as an interactive display element such as a button) may be placed in various locations within the website (e.g., on a respective SRP, DP, homepage, or the like). For example, as shown, a respective ingress point (e.g., ingress point 304A) may be comprised in an interactive thumbnail object (e.g., interactive thumbnail object 302A), indicating a link between the respective ingress point and the search result (e.g., Coffee Machine X) represented by the interactive thumbnail object. As described herein, the orchestration service 106 may be configured to detect a selection event associated with one or more ingress points 304A-304N. In response to a selection event with a respective ingress point (e.g., ingress point 304A), the orchestration service 106 may be configured to retrieve various data associated with the corresponding search result (e.g., DP data 210, search result detail data 212, and/or the like associated with Coffee Machine X) and store the data in a context container 108 associated with the respective session.

Additionally, in response to detecting a selection event associated with the respective ingress point (e.g., ingress point 304A), the orchestration service 106 may execute one or more filtering operations to temporarily remove, hide, disregard, or otherwise update any existing context container data 120 that has been stored in the context container 108 since the initiation of the current session (e.g., since the execution of the search related to search query 312). In this example, the context container 108 may initially comprise context container data 120 such as various session context data 202 (e.g., SRP data 208, search query data 214, engagement signal data 218) related to a group of search results displayed on the SRP.

When the ingress point related to a specific search result is selected (e.g., ingress point 304A related to Coffee Machine X), the orchestration service 106 may filter the existing context container data 120 based on the specific search result. For example, the orchestration service 106 may filter the existing context container data 120 such that one or more portions of session context data 202 such as SRP data 208, engagement signal data 218, and/or the like such that only DP data 210, search result detail data 212, and/or the like associated with the specific search result (e.g., Coffee Machine X) is persisted in the context container 108. In some examples, the orchestration service 106 may remove the filtered context container data 120 from the context container 108 and cause the filtered context container data 120 to be stored in a separate storage location (e.g., a different storage device and/or memory allocation).

As described herein, the orchestration service 106 may automatically facilitate the generation of an input prompt 116 comprising at least the updated context container data 120 and cause the provision of the input prompt to the generative model 124. For example, as described herein, the generative model 124 may be prompted to pre-generate one or more suggested queries (e.g., query 122) and corresponding suggested query response data (e.g., generative model output 126) related to the one or more suggested queries. Additionally, when the ingress point related to a specific search result is selected (e.g., ingress point 304A related to Coffee Machine X), the orchestration service 106 may cause the display (e.g., opening or expansion) of a conversation layer object 306 on a respective user interface (e.g., user interface 300 of the SRP generated based on the search query 312).

As shown, the conversation layer object 306 may be an interactive chat window configured to facilitate communication between a respective computing device (e.g., device 102) and the generative model 124. As described herein, the conversation layer object 306 may be configured to facilitate a series of conversational turns between the respective computing device (e.g., device 102) and the generative model 124. The orchestration service 106 may be configured to update the configuration of the conversation layer object 306 based on the evolving context of the respective session, thereby indicating the current context being utilized by the generative model 124 to generate responses. For example, when the ingress point a specific search result is selected (e.g., ingress point 304A related to Coffee Machine X), the orchestration service 106 may cause the display of various interactive display elements within the conversation layer object 306.

As shown, the conversation layer object 306 comprises interactive display elements 308A-308N associated with respective suggested queries generated by the generative model 124 based on the context container data 120 (e.g., DP data 210, search result detail data 212) related to the specific search result (e.g., Coffee Machine X). As show, the suggested queries indicated by the interactive display elements 308A-308C recite "Can you program it the night before?", "How long does it keep coffee warm?", and "What is the cup capacity?" respectively. In this example, if the orchestration service 106 detects a selection event associated with the interactive display element 308A, the orchestration service 106 would facilitate the retrieval of generative model output 126 associated with pre-generated suggested query response data that may describe (e.g., list, summarize) the programming functionalities of the Coffee Machine X.

Additionally, in some examples, the conversation layer object 306 comprises interactive display element 314 (e.g., a text field) that enables the respective computing device (e.g., device 102) to input text (e.g., a query 122). As described herein, if the computing device (e.g., device 102) enters a query (e.g., query 122), the orchestration service 106 may detect the text entry event and may prompt the caching service 110 to determine whether any pre-generated suggested query response data related to the current session context (e.g., context container data 120) that matches the query exists in the memory cache. If any pre-generated suggested query response data matches the manually-entered query (e.g., query 122), the caching service 110 may return pre-generated suggested query response data to the orchestration service 106 for rendering in the conversation layer object 306. In such an example, if no pre-generated suggested query response data related to the current session context (e.g., context container data 120) matches the manually-entered query (e.g., query 122), the caching service 110 may be configured to prompt the generative model 124 to generate real-time query response data based on both the manually-entered query and the context container data 120 to be provided to the conversation layer object 306 in real time (or near-real time).

Additionally as shown, the conversation layer object 306 comprises interactive display element 310A associated with the specific search result (e.g., Coffee Machine X). In some examples, the interactive display element 310A may describe the corresponding search result via a text summary (e.g., a descriptive title) and/or an image (e.g., a thumbnail image representing the search result), thus indicating a current context within which the computing device (e.g., device 102) and the generative model 124 are communicating.

In some examples, the orchestration service 106 may detect a selection event with respect to a dismissal affordance comprised within the interactive display element 310A (e.g., an "X" button) indicating a request to remove and/or revert the current context associated with the respective search result (e.g., Coffee Machine X). In such cases, the orchestration service 106 may be configured to update the context container 108 to revert to a previous context and/or a broader context such as the session context data 202 such as SRP data 208, engagement signal data 218 and/or the like which was filtered out upon the selection event processed with respect to the ingress point 304A. The updated context container data 120 may then be provided to the generative model 124. In this manner, the CGMI system 104 may dynamically switch and/or update the context container data 120 provided to the generative model 124 in real time (or near-real time) throughout a respective session. Additionally, in some examples, the orchestration service 106 may detect a selection event with respect to the interactive display element 310A (e.g., a selection event with the body of interactive display element and/or the thumbnail image). In such an example, the orchestration service 106 may cause the web browser associated with the computing device (e.g., device 102) to navigate to a webpage (e.g., a DP) associated with the specific search result (e.g., Coffee Machine X).

Figure 3B:
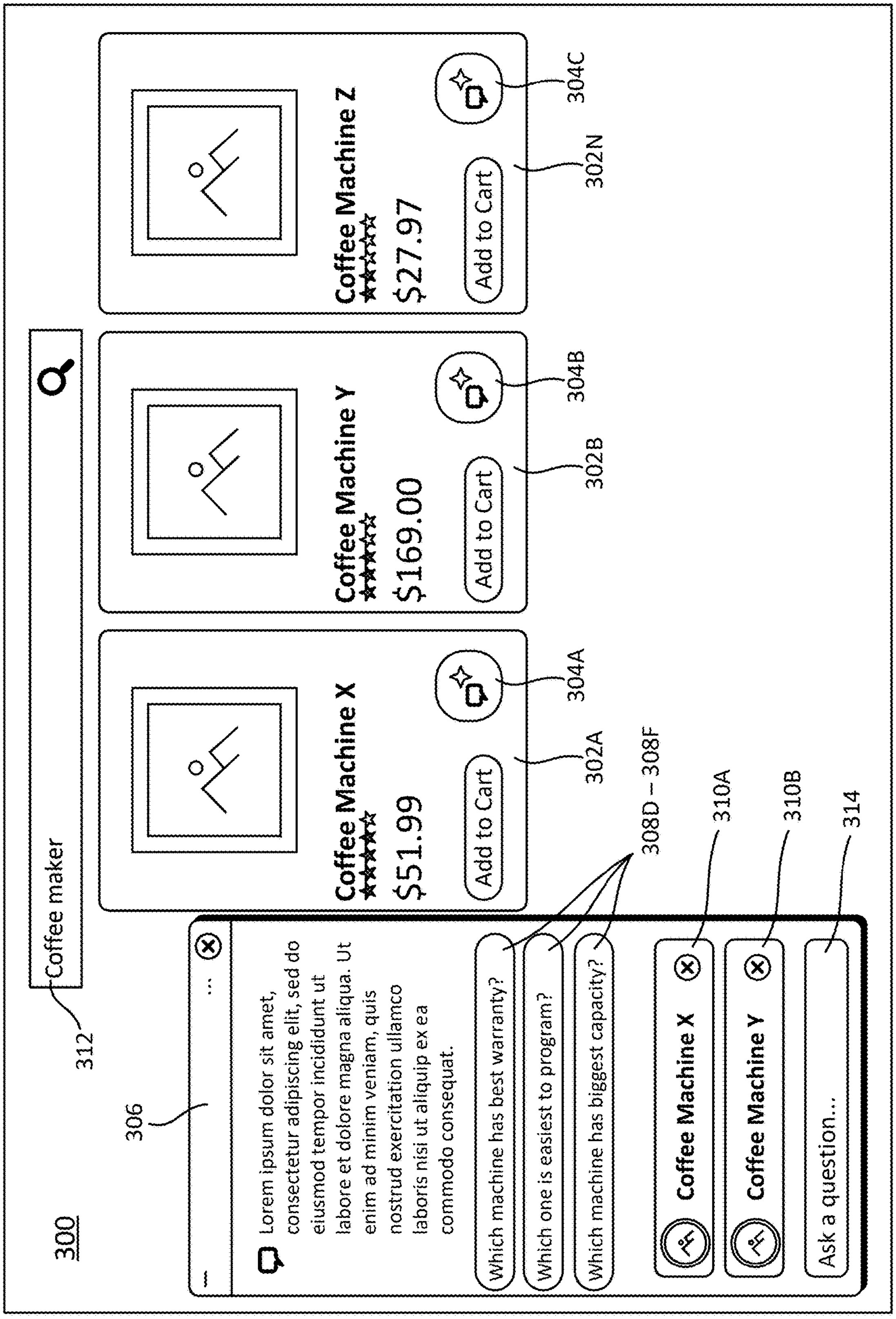
FIG. 3B illustrates another example user interface of an SRP of a website that is configured to leverage a CGMI system in accordance with various aspects of the present disclosure.

FIG. 3B illustrates another view of the example user interface 300 of an SRP of a website that is configured to leverage the CGMI system 104. As described herein, in some examples, the CGMI system 104 may be configured to track the various search results (e.g., products) with which the respective computing device (e.g., device 102) has engaged in implicit and/or explicit ways. For example, various session context data 202 (e.g., engagement signal data 218 captured as the computing device (e.g., device 102) navigates a website) and/or user context data 204 (e.g., browsing history data 224) may be leveraged to prompt the generative model 124 to make various insights, recommendations, and/or comparisons related to the various search results (e.g., products) with which the computing device has engaged. For example, the orchestration service 106 may be configured to track the various search results the computing device (e.g., device 102) has selected during a respective session (e.g., by determining which interactive thumbnail objects 302A-302N have been interacted with).

As shown, in some examples, two or more respective search results (e.g., two or more products) that the computing device (e.g., device 102) has interacted with may be indicated in the conversation layer object 306. For example, if the respective computing device (e.g., device 102) has interacted with both interactive thumbnail objects 302A and 302B respectively during the session, the orchestration service 106 may cause the display of interactive display elements 310A and 310B respectively representing Coffee Machine X and Coffee Machine Y in the conversation layer object 306. As shown, the conversation layer object 306 may be configured to display interactive display elements 310A and 310B in a stacked or vertical configuration (e.g., interactive display element 310A may be depicted directly above interactive display element 310B).

However, in various examples, alternative configurations of the conversation layer object 306 may be implemented. For example, interactive display elements and/or graphical representations related to multiple respective search results (e.g., multiple products, such as the Coffee Machine X and the Coffee Machine Y) may be placed in a side-by-side or horizontal configuration. Additionally or alternatively, in some examples, the conversation layer object 306 may be configured to comprise an interactive carousel that may be configured to enable multiple interactive display elements and/or graphical representations related to multiple respective search results (e.g., multiple products, such as the Coffee Machine X and the Coffee Machine Y) to be rotated, cycled, scrolled through, and/or otherwise interacted with (e.g., based on a finger swipe, mouse click, etc.).

In such examples, the orchestration service 106 may use various data (e.g., DP data 210, search result detail data 212) related to the two or more search results (e.g., Coffee Machine X and Coffee Machine Y) to filter the context container data 120 for prompting the generative model 124. As such, the generative model 124 may be prompted to generate one or more suggested queries and corresponding suggested query response data based on the two or more search results.

For example, as shown, the conversation layer object 306 comprises interactive display elements 308D-308N associated with respective suggested queries generated by the generative model 124 based on the context container data 120 (e.g., DP data 210, search result detail data 212) related to the two search results (e.g., Coffee Machine X and Coffee Machine Y). In such an example, the suggested queries may be questions such as "Which machine has the best warranty?," "Which one is easiest to program?," and/or "Which machine has the biggest capacity?." In this example, if the orchestration service 106 detects a selection event associated with the interactive display element 308D, the orchestration service 106 would facilitate the retrieval of generative model output 126 associated with pre-generated suggested query response data that may describe (e.g., list, summarize) the warranty information associated with both the Coffee Machine X and Coffee Machine Y respectively, and/or provide insight describing which of the two coffee machines has better warranty terms.

In some examples, the CGMI system 104 may be configured to facilitate the generation of various insights and/or recommendations (e.g., product recommendations) based on the context container data 120 of a particular session. In this regard, the generative model 124 may be prompted to determine an intent associated with the session based on the corresponding context container data 120. For example, if the respective computing device (e.g., device 102) has interacted with multiple different search results returned based on multiple discrete search queries including "coffee maker," "dinner plates," and "dish towels," the generative model 124 may determine that the intent of the session relates to an individual's desire to furnish a new kitchen. In such an example, the generative model 124 may generate generative model output 126 comprising one or more recommendation for additional products which may align with the inferred intent of the session. For example, the generative model 124 may provide generative model output 126 comprising recommendations for various products such as cooking utensils, pantry organizers, kitchen trashcans, and/or the like.

As another example, if the respective computing device (e.g., device 102) has interacted with multiple different search results returned based on multiple discrete search queries including "grill tools," "foil cooking pan," and "disposable tablecloth," the generative model 124 may determine that the intent of the session relates to an individual's desire to host a cookout. In such an example, the generative model 124 may generate generative model output 126 comprising one or more recommendation for additional products such as disposable dinnerware, portable grills, coolers, and/or the like. Such generative model output 126 may be displayed in a respective conversation layer object (e.g., conversation layer object 306) during the session. Additionally or alternatively, various interactive display elements (e.g., buttons, hyperlinks, etc.) configured to navigate to a DP associated with the search results recommended based on the inferred session intent may be provided by a respective conversation layer object (e.g., conversation layer object 306)

In some examples, the CGMI system 104 may be configured to solicit explicit confirmation that one or more inferences made by the generative model 124 are correct. Continuing the above example, if the generative model 124 infers that the intent of the current session is that the user is throwing a cookout, the generative model 124 may generate generative model output 126 to confirm if the inference is correct. For example, the respective conversation layer object (e.g., conversation layer object 306) may be used to solicit user input in response to a question such as "Are you preparing for a cookout?". In such an example, a user may respond via the conversation layer object (e.g., conversation layer object 306) by way of a selection event associated (e.g., clicking a "Yes/No" button) or entering a natural language response such as "yes" (e.g., using the interactive display element 314). If the user confirms that the intent of the current session is to shop for cookout supplies, the generative model 124 may utilize the current context container data 120 and the confirmation of the session intent to identify various other search results (e.g., products) that may be of interest to the user.

Additionally or alternatively, in some examples, the CGMI system 104 may leverage various user context data 204 associated with a particular user profile to infer a user type related to the user profile. A user type may be a classification (e.g., generated by generative model 124) that indicates a personality type, behavior type, career field, lifestyle, and/or the like associated with a corresponding user profile. The generative model 124 may leverage such user context data 204 to generate various insights and/or recommendations related to one or more respective search results associated with a search query.

For example, if a user type indicates a user profile associated with a respective session may be a business professional who frequently purchases items for an office environment, the generative model 124 may generate various recommendations and/or provide insights that are influenced by the user type. For example, referencing the session related to FIG. 3B, if the user profile associated with the business professional user type is browsing coffee machines, the generative model 124 may recommend a first product (e.g., Coffee Machine Y) over a second product (e.g., Coffee Machine Z) if the generative model 124 determines the first product has a higher liquid capacity than the second product. In such an example, the first product having the higher liquid capacity (e.g., Coffee Machine Y) may be more appropriate for an office environment comprising multiple employees. The generative model 124 may generate generative model output 126 indicating one or more reasons the first product (e.g., Coffee Machine Y) should be purchased over the second product (e.g., Coffee Machine Z) based on the user type and/or other user context data 204 associated with the respective user profile.

Figure 3C:
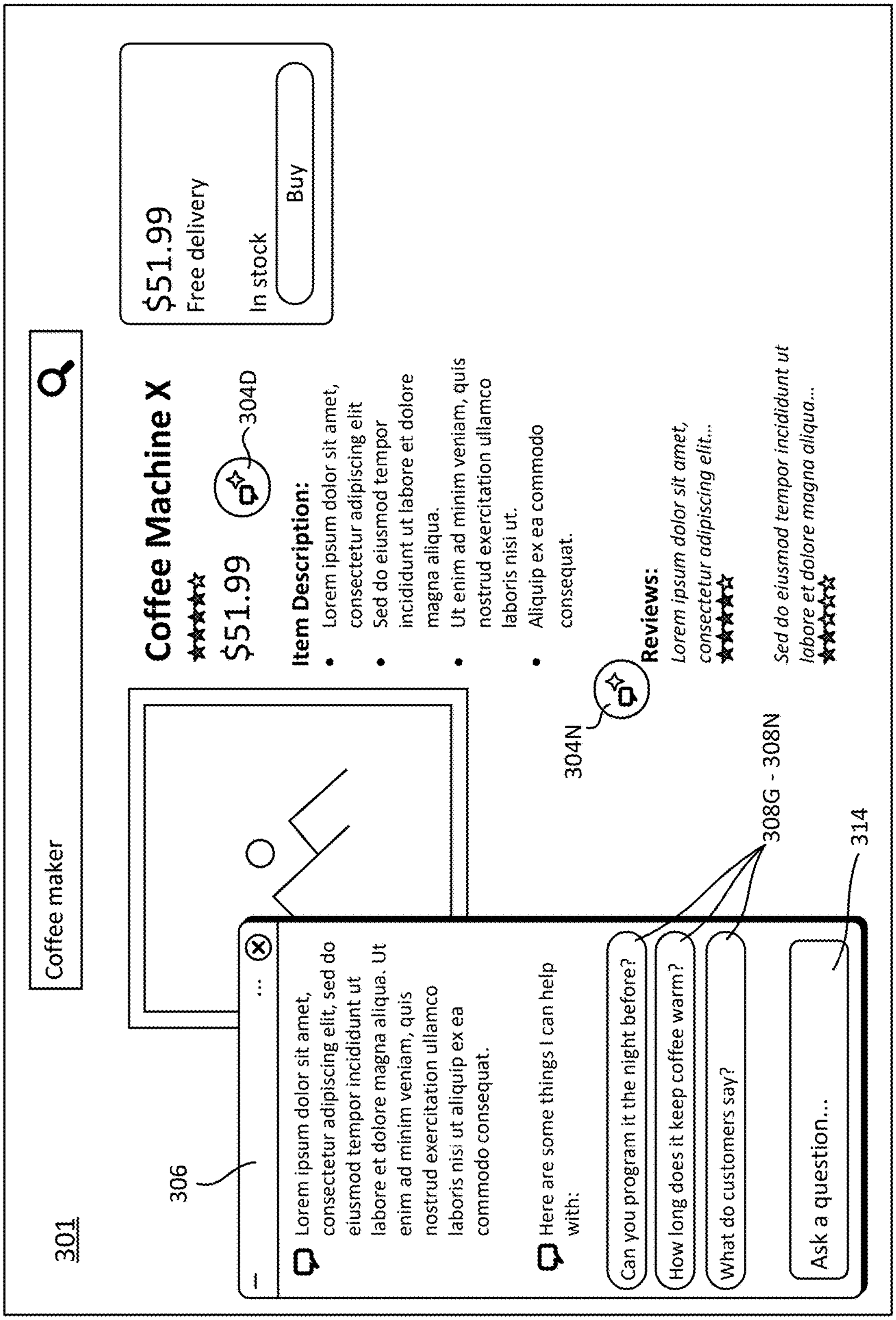
FIG. 3C illustrates an example user interface of a details page (DP) of a website that is configured to leverage a CGMI system in accordance with various aspects of the present disclosure.

FIG. 3C illustrates an example user interface 301 of a DP of a website that is configured to leverage a CGMI system 104. As shown, the example user interface 301 may be related to a DP associated with a specific search result (e.g., a product). As described herein, in some examples, the orchestration service 106 may be configured to track which respective webpages have been accessed and/or are currently being accessed by a respective computing device (e.g., device 102) and/or user profile during a respective session. For example, the orchestration service 106 may determine that the respective computing device (e.g., device 102) navigated from a first webpage (e.g., the SRP associated with the user interface 300) to a second webpage (e.g., the DP associated with Coffee Machine X shown on user interface 301).

In such an example, the orchestration service 106 may automatically update the context container data 120 associated with the respective session to include contextual data associated with the second webpage (e.g., DP data 210) at such a time as the second webpage is accessed. Additionally, in some such examples, the orchestration service 106 may also automatically update the context container 108 by filtering out (e.g., removing, hiding, and/or otherwise disregarding) preexisting context container data 120 comprised in the context container 108 (e.g., context data related to the previous webpage (e.g., the SRP)) at such a time as the second webpage is accessed. As such, the generative model 124 may be configured to generate various generative model output 126 (e.g., suggested queries and suggested query response data) based on the second webpage (e.g., DP data 210) which may be stored in the memory cache and/or represented in the conversation layer object 306. Additionally, visual indications related to the previous context container data 120 (e.g., interactive display element 310A) may be removed from the conversation layer object 306. Furthermore, in some examples, the conversation context (e.g., conversation turn data 216) may be persisted in the context container 108 throughout the session as various webpages are navigated.

As shown, respective ingress points (e.g., ingress point 304D) may be associated with a particular webpage of a respective website (e.g., the DP associated with Coffee Machine X). In examples in which an ingress point has not yet been utilized during a respective session and a computing device (e.g., device 102) has navigated to a DP associated with a specific search result (e.g., the DP associated with Coffee Machine X), an ingress point placed in a general location (e.g., ingress point 304D) may be utilized to access the conversation layer object (e.g., conversation layer object 306). As described herein, in response to a selection event with a respective ingress point (e.g., ingress point 304D), the orchestration service 106 may be configured to retrieve various data associated with the corresponding search result (e.g., DP data 210, search result detail data 212, and/or the like associated with Coffee Machine X) and store the data in a context container 108.

Additionally or alternatively, in some examples, ingress points (e.g., ingress point 304N) may be associated with a specific sub-group of DP data 210 associated with the particular webpage (e.g., customer review data, similar product data, or the like). For example, as shown, a respective ingress point (e.g. ingress point 304N) may be associated with the customer review data associated with the corresponding search result represented by the DP (e.g., the Coffee Machine X). In such an example, if the orchestration service 106 detects a selection event associated with an ingress point associated with a specific sub-group of DP data 210 (e.g., ingress point 304N associated with the customer review data related to Coffee Machine X), the specific sub-group of DP data 210 may be used to filter the context container data 120. In this manner, the generative model 124 may be configured to generate various generative model output 126 (e.g., suggested queries and suggested query response data) based on a specific sub-group of DP data 210.

Figure 4:
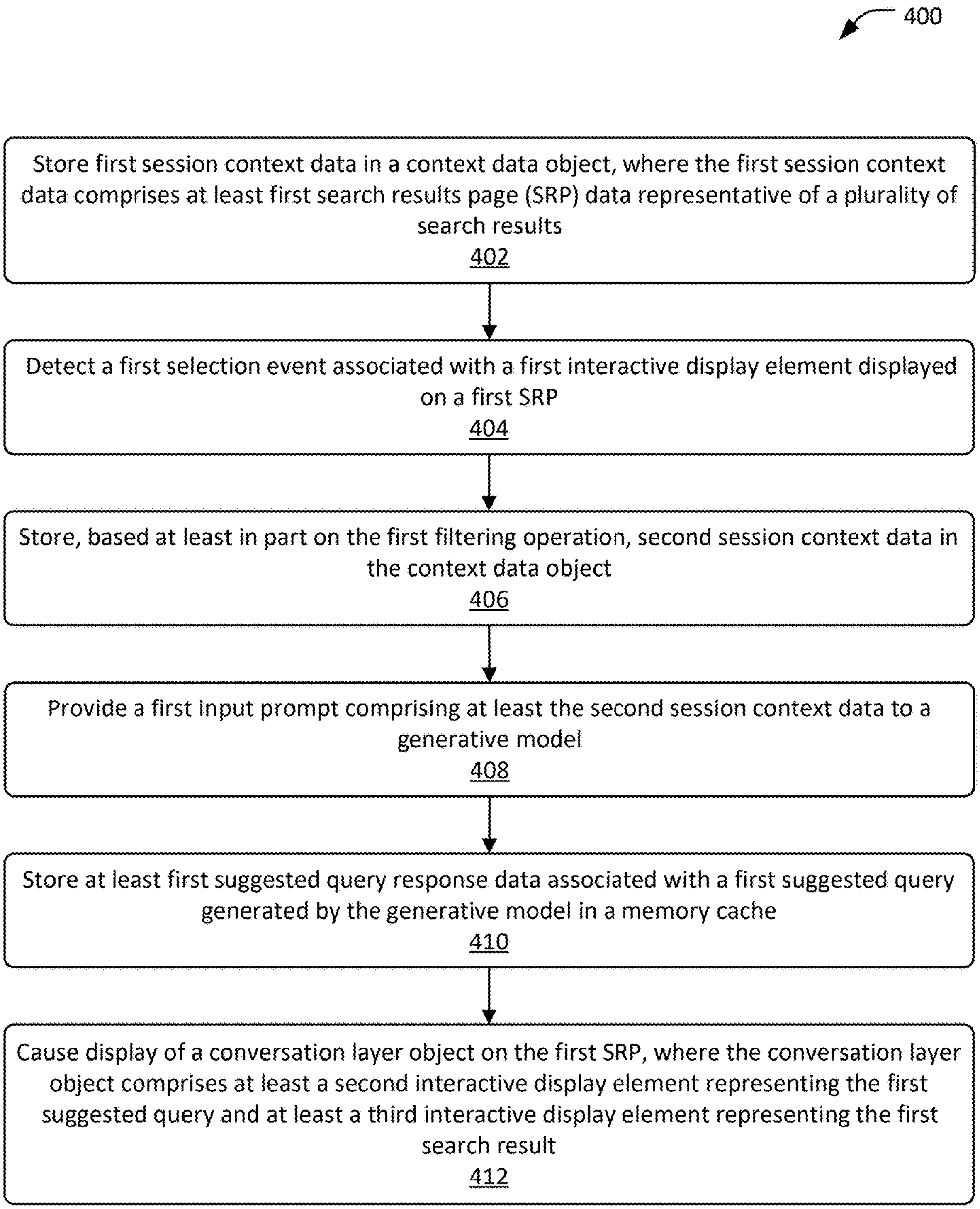
FIG. 4 is a flowchart illustrating an example CGMI process in accordance with various aspects of the present disclosure.

FIG. 4 is a flowchart illustrating an example process 400 in which various CGMI operations may be executed in accordance with various aspects of the present disclosure. The process 400 illustrated in FIG. 4 may be executed by one or more computing devices. The actions of process 400 may represent a series of instructions comprising computer-readable machine code executable by a processing unit of a computing device. In various examples, the computer-readable machine code may be comprised of instructions selected from a native instruction set of the computing device and/or an operating system of the computing device. Accordingly, the process 400 and/or operations thereof may represent all or some part of a computer-implemented method. Various actions in process 400 may be described above with reference to elements of FIGS. 1-2, and/or 3A-3C or below with reference to FIGS. 5-6. Although shown in a particular order, the steps of process 400 may instead be performed in a different order. Additionally, various steps may be performed in parallel in various implementations. Further, some steps may be omitted and/or other steps may be added in accordance with the various techniques described herein.

The process 400 may begin at operation 402, at which an orchestration service (e.g., orchestration service 106) may be configured to store first session context data (e.g., session context data 202) in a context data object (e.g., context container 108), where the first session context data comprises at least first SRP data (e.g., SRP data 208) representative of a plurality of search results. In some examples, the first session context data may be stored subsequent to receiving, during a first browsing session, a first search query (e.g., search query 312) from a first computing device (e.g., device 102). As described herein, the orchestration service 106 may be configured to cause display of a first SRP on the first computing device (e.g., device 102), where the first SRP comprises the plurality of search results identified based at least in part on the first search query.

Processing may continue at operation 404, at which the orchestration service (e.g., orchestration service 106) may be configured to detect a first selection event associated with a first interactive display element (e.g., ingress point 304A) displayed on the first SRP, where the first interactive display element is associated with a first search result (e.g., Coffee Machine X) of the plurality of search results, and where the first selection event is associated with a first filtering operation. In some examples, the first interactive display element may be comprised in a first interactive thumbnail object (e.g., interactive thumbnail object 302A) of a plurality of interactive thumbnail objects, where the first interactive thumbnail object is associated with the first search result, and where the plurality of interactive thumbnail objects is associated with at least the first SRP data.

Processing may continue at operation 406, at which the orchestration service (e.g., orchestration service 106) may be configured to store, based at least in part on the first filtering operation, second session context data in the context data object (e.g., context container 108), where the second session context data comprises at least first detail data representative of the first search result (e.g., DP data 210, search result detail data 212). Additionally, in some examples, the orchestration service (e.g., orchestration service 106) may execute a first update with respect to the context data object based on the first filtering operation, wherein the first update comprises at least removing the first session context data from the context data object.

Processing may continue at operation 408, at which an inference service (e.g., inference service 114) may be configured to provide a first input prompt (e.g., input prompt 116) comprising at least the second session context data to a generative model (e.g., generative model 124).

Processing may continue at operation 410, at which a caching service (e.g., caching service 110) may be configured to store at least first suggested query response data associated with a first suggested query in a memory cache, where the first suggested query response data and the first suggested query are generated by the generative model (e.g., generative model 124) based on the first input prompt (e.g., input prompt 116).

Processing may continue at operation 412, at which the orchestration service (e.g., orchestration service 106) may be configured to cause display of a conversation layer object (e.g., conversation layer object 306) on the first SRP, where the conversation layer object comprises at least a second interactive display element (e.g., interactive display element 308A) representing the first suggested query and at least a third interactive display element (e.g., interactive display element 310A) representing the first search result.

Additionally or alternatively, in some examples, prior to detecting the first selection event, the inference service (e.g., inference service 114) may be configured to provide a second input prompt (e.g., different than the first input prompt) comprising at least the first session context data to the generative model (e.g., generative model 124). In such an example, the caching service (e.g., caching service 110) may be configured to store at least second suggested query response data associated with a second suggested query in the memory cache, where the second suggested query response data and the second suggested query are generated by the generative model based on the second input prompt.

Additionally or alternatively, in some examples, the orchestration service (e.g., orchestration service 106) may be configured to detect a second selection event (e.g., different than the first selection event) associated with the second interactive display element (e.g., interactive display element 308A) representing the first suggested query. In such an example, the caching service (e.g., caching service 110) may be configured to retrieve, based at least in part on the second selection event, the first suggested query response data generated by the generative model (e.g., generative model 124) from the memory cache. In such an example, the orchestration service (e.g., orchestration service 106) may be configured to cause display of the first suggested query response data in the conversation layer object (e.g., conversation layer object 306). The first suggested query response data may comprise one or more of a search result insight, question answer, and/or search result comparison associated with the first search result.

Additionally or alternatively, in some examples, the orchestration service (e.g., orchestration service 106) may be configured to detect a second selection event (e.g., different than the first selection event) associated with the third interactive display element (e.g., interactive display element 310A) representing the first search result, where the second selection event is associated with a second filtering operation. In such an example, the orchestration service (e.g., orchestration service 106) may be configured to execute a second update with respect to the context data object (e.g., conversation layer object 306) based on the second filtering operation, where the second update comprises at least removing the second session context data from the context data object (e.g., context container 108) and causing storage of at least the first session context data in the context data object. In such an example, the inference service (e.g., inference service 114) may be configured to provide a second input prompt (e.g., different than the first input prompt) comprising at least the first session context data to the generative model (e.g., generative model 124).

Additionally or alternatively, in some examples, the orchestration service (e.g., orchestration service 106) may be configured to detect a second selection event (e.g., different than the first selection event) associated with the third interactive display element representing the first search result. In such an example, the orchestration service (e.g., orchestration service 106) may be configured to cause display of a first search result detail page associated with the first search result on the first computing device (e.g., device 102). In such an example, the orchestration service (e.g., orchestration service 106) may be configured to store, based at least in part on the second selection event, third session context data in the context data object (e.g., context container 108), where the third session context data comprises at least first search result detail page data representative of the first search result. In such an example, the inference service (e.g., inference service 114) may be configured to provide a second input prompt (e.g., different than the first input prompt) comprising at least the third session context data to the generative model (e.g., generative model 124). In such an example, the caching service (e.g., caching service 110) may be configured to store at least second suggested query response data associated with a second suggested query in a memory cache, where the second suggested query response data and the second suggested query are generated by the generative model (e.g., generative model 124) based on the second input prompt In such an example, the orchestration service (e.g., orchestration service 106) may be configured to cause display of the conversation layer object (e.g., conversation layer object 306) on the first search result detail page, where the conversation layer object comprises at least a fourth interactive display element representing the second suggested query, and where causing display of the conversation layer object on the first search result detail page comprises at least removing the third interactive display element representing the first search result from the conversation layer object.

Additionally or alternatively, in some examples, the orchestration service (e.g., orchestration service 106) may be configured to detect a first text entry event associated with a fourth interactive display element (e.g., interactive display element 314 configured as a text field) comprised in the conversation layer object (e.g., conversation layer object 306). In such an example, the orchestration service (e.g., orchestration service 106) may be configured to receive, based at least in part on the first text entry event, first query data (e.g., a natural language request). In such an example, the caching service (e.g., caching service 110) may be configured to determine that a first suggested query response associated with the first query data is not stored in the memory cache. In such an example, the inference service (e.g., inference service 114) may be configured to provide a second input prompt (e.g., different than the first input prompt) comprising at least the first query data and the second session context data to the generative model (e.g., generative model 124). In such an example, the inference service (e.g., inference service 114) may be configured to retrieve first real-time query response data from the generative model, where the first real-time query response data is generated based on the second input prompt. In such an example, the orchestration service (e.g., orchestration service 106) may be configured to cause display of the first real-time query response data in the conversation layer object (e.g., conversation layer object 306).

Figure 5:
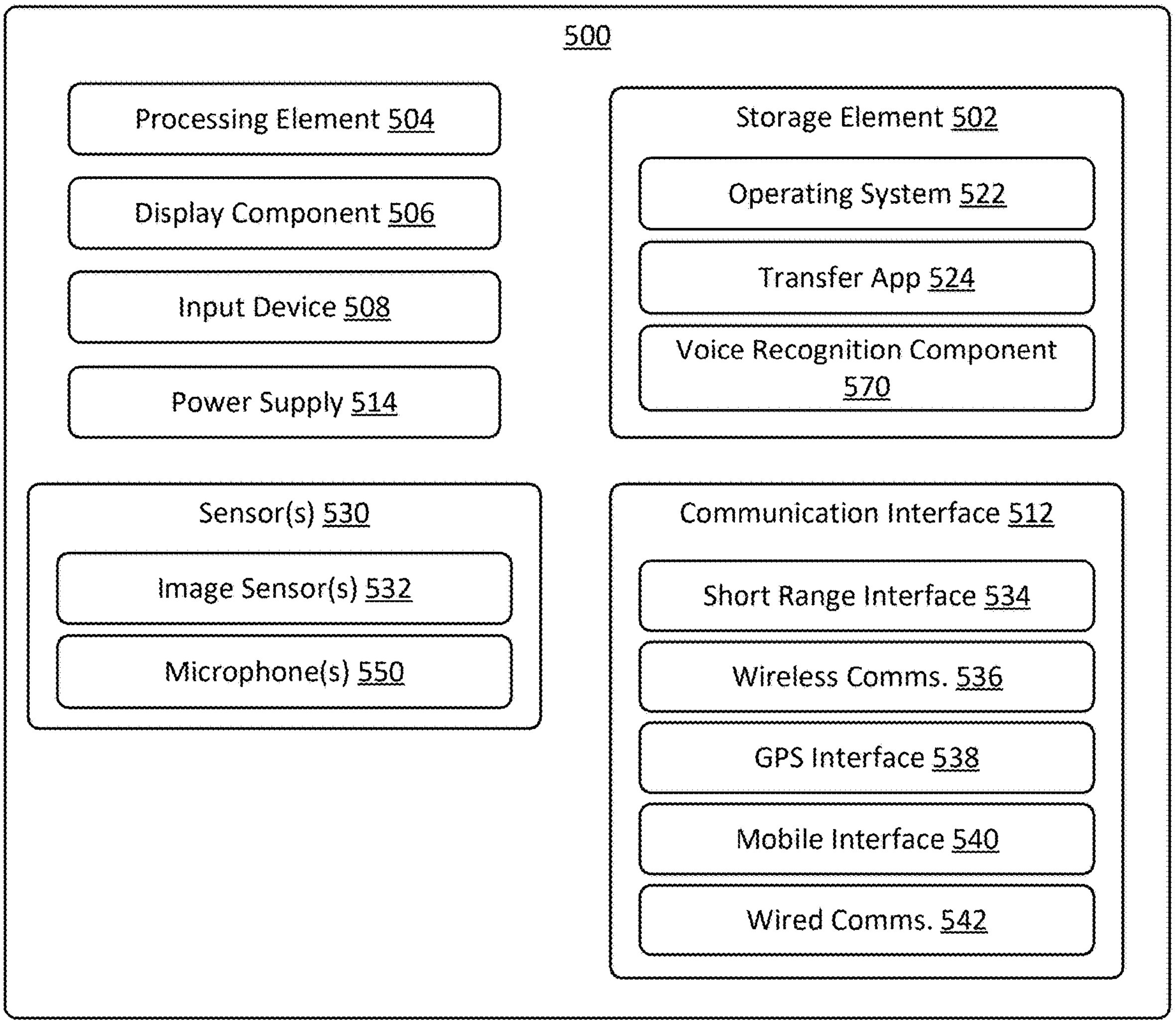
FIG. 5 illustrates a block diagram of an example architecture of a network-connected device in accordance with various aspects of the present disclosure.

FIG. 5 is a block diagram showing an example architecture 500 of a network-connected device (e.g., device 102 or another computing device). It will be appreciated that not all computing devices will include all of the components of the architecture 500 and some computing devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to a natural language processing system. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. In various examples, the storage element 502 may comprise one or more components of the natural language processing system.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 550 included in the architecture 500. In some examples, the transfer application 524 may also be configured to send the received voice requests to one or more voice recognition servers.

When implemented in some computing devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors, or other types of display devices, etc. As described herein, display component 506 may be effective to display content determined provided by a skill executed by the processing element 504 and/or by another computing device.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 550 or an array of microphones for capturing sounds, such as voice requests. Voice recognition component 570 may interpret audio signals of sound captured by microphone 550. In some examples, voice recognition component 570 may listen for a "wakeword" to be received by microphone 550. Upon receipt of the wakeword, voice recognition component 570 may stream audio to a voice recognition server for analysis, such as a natural language processing system. In various examples, voice recognition component 570 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 502.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensor(s) 530 such as, for example, one or more position sensors, image sensors, and/or motion sensors. An image sensor 532 is shown in FIG. 5. An example of an image sensor 532 may be a camera configured to capture color information, image geometry information, and/or ambient light information.

Figure 6:
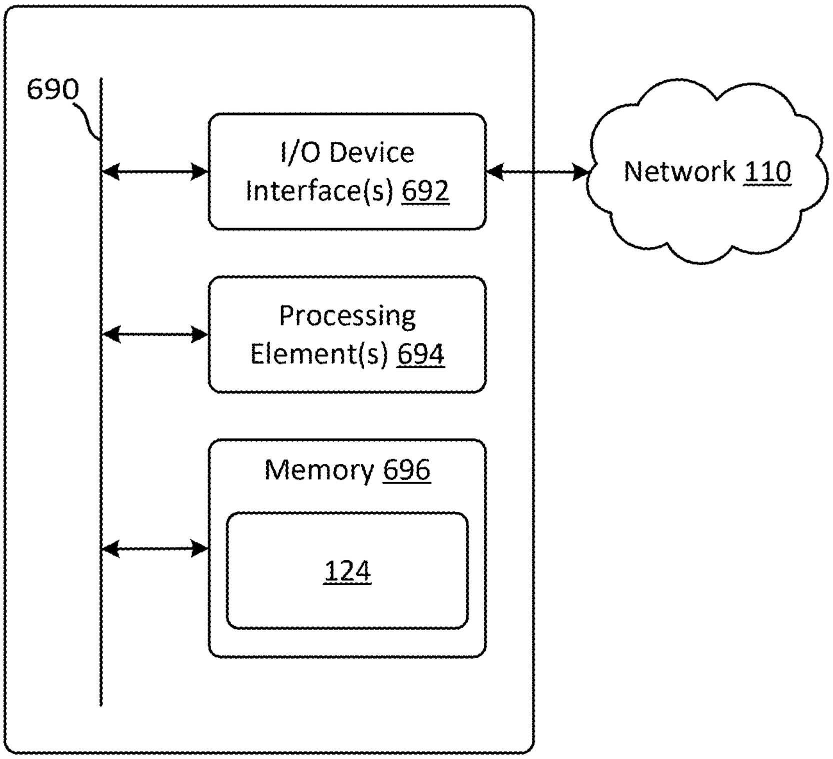
FIG. 6 is a block diagram showing an example architecture of a computing device that may be used in accordance with various aspects described herein.

FIG. 6 is a block diagram conceptually illustrating example components of a remote device, such as a computing device executing a particular skill, executing one or more components of an CGMI system (e.g., CGMI system 104). For example, the various components of FIG. 6 may be used to implement various operations associated with the generative model 124. Additionally or alternatively, the various components of FIG. 6 may be used to implement various operations associated with a natural language processing system. Multiple computing devices may be included in the system, such as one speech processing computing device for performing ASR processing, one speech processing computing device for performing NLU processing, one or more skill computing device(s) implementing skills, a CGMI system (e.g., CGMI system 104), etc. In operation, each of these devices (or groups of devices) may include non-transitory computer-readable and computer-executable instructions that reside on the respective device, as will be discussed further below. The remote device of FIG. 6 may communicate with one or more other devices over a network 128 (e.g., a wide area network or local area network).

Each computing device of a CGMI system (e.g., CGMI system 104) may include one or more processing element(s) 694, which may each include at least one central processing unit (CPU) for processing data and computer-readable instructions, and a memory 696 for storing data and instructions of the respective device. In at least some examples, memory 696 may store, for example, a list of N-best intents data that may be generated for particular request data. In some examples, memory 696 may store one or more ML models of an generative model, such as ML models associated with various multi-head attention modules, NLP models, LLMs, computer vision models, etc., when loaded from memory 696. In various further examples, memory 696 may be effective to store instructions effective to program processing element(s) 694 to perform the various techniques described above in reference to FIGS. 1-2, 3A-3C, and/or 4-5.

Accordingly, in FIG. 6, the generative model 124 is depicted as being stored within memory 696, as an example. The memory 696 may individually include volatile random access memory (RAM), non-volatile read only memory (ROM), non-volatile magnetoresistive memory (MRAM), and/or other types of memory. Each computing device of a generative model 124 (and/or a component thereof) may also include memory 696 for storing data and controller/processor-executable instructions. Each memory 696 may individually include one or more non-volatile storage types such as magnetic storage, optical storage, solid-state storage, etc. Each computing device of a generative model 124 may also be connected to removable or external non-volatile memory and/or storage (such as a removable memory card, memory key drive, networked storage, etc.) through respective input/output device interfaces 692. In various examples, the feature data and/or training data used by the various ML models may be stored and/or cached in memory 696.

Computer instructions for operating each computing device of a generative model 124 may be executed by the respective device's processing element(s) 694, using the memory 696 as temporary "working" storage at runtime. A device's computer instructions may be stored in a non-transitory manner in non-volatile memory (e.g., a non-transitory computer-readable memory), memory 696, or an external device(s). Alternatively, some or all of the executable instructions may be embedded in hardware or firmware on the respective device in addition to or instead of software.

Each computing device of the various computing devices described herein may include input/output device interfaces 692. A variety of components may be connected through the input/output device interfaces 692, as will be discussed further below. Additionally, each computing device of a generative model 124 may include a data bus 690 for conveying data among components of the respective device. Each component within a computing device of a generative model 124 may also be directly connected to other components in addition to (or instead of) being connected to other components across the data bus 690.

As noted above, multiple devices may be employed in a single system. In such a multi-device system, each of the devices may include different components for performing different aspects of the system's processing. The multiple devices may include overlapping components. The components of a generative model 124, as described herein, are exemplary, and may be located as a stand-alone device or may be included, in whole or in part, as a component of a larger device or system.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Various systems and processes described herein may include or be implemented using or in conjunction with or for a device or electronic device. A device or electronic device may be, for example, one or more of a smart home device, digital assistant device, multimedia device, networked device, desktop computer, laptop computer, tablet computer, smartphone, wearable device (e.g., headset, smartwatches, smart glasses, etc.), kiosk, and/or similar electronic devices. As used herein, computing devices such as smartphones, laptop computers, tablet computers, and/or wearable devices may generally be referred to as mobile devices.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some examples, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described examples of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

In addition, conditional language, such as, among others, "can," "could," "might," or "may," unless specifically stated otherwise, or otherwise understood within the context as used, is generally intended to convey that certain examples include, while other examples do not include, certain features, elements, and/or steps.

What is claimed is:

1. A computer-implemented method comprising:

receiving, during a first browsing session, a first search query from a first computing device;

causing display of a first search results page (SRP) on the first computing device, wherein the first SRP comprises a plurality of search results identified based at least in part on the first search query;

storing first session context data in a context data object associated with the first browsing session, wherein the first session context data comprises at least first SRP data representative of the plurality of search results;

detecting a first selection event associated with a first interactive display element displayed on the first SRP, wherein the first interactive display element is associated with a first search result of the plurality of search results, and wherein the first selection event is associated with a first filtering operation;

storing, based at least in part on the first filtering operation, second session context data in the context data object, wherein the second session context data comprises at least first detail data representative of the first search result;

providing a first input prompt comprising at least the second session context data to a generative model;

storing at least first suggested query response data associated with a first suggested query in a memory cache, wherein the first suggested query response data and the first suggested query are generated by the generative model based on the first input prompt; and causing display of a conversation layer object on the first SRP, wherein the conversation layer object comprises at least a second interactive display element representing the first suggested query and at least a third interactive display element representing the first search result.

2. The computer-implemented method of claim 1, further comprising:

detecting a second selection event associated with the second interactive display element representing the first suggested query;

retrieving, based at least in part on the second selection event, the first suggested query response data generated by the generative model from the memory cache; and causing display of the first suggested query response data in the conversation layer object.

3. The computer-implemented method of claim 1, further comprising executing a first update with respect to the context data object based on the first filtering operation, wherein the first update comprises at least removing the first session context data from the context data object.

4. The computer-implemented method of claim 3, further comprising:

detecting a second selection event associated with the third interactive display element representing the first search result, wherein the second selection event is associated with a second filtering operation;

executing a second update with respect to the context data object based on the second filtering operation, wherein the second update comprises at least removing the second session context data from the context data object and causing storage of at least the first session context data in the context data object; and providing a second input prompt comprising at least the first session context data to the generative model.

5. A computer-implemented method comprising:

storing first session context data in a context data object, wherein the first session context data comprises at least first search results page (SRP) data representative of a plurality of search results;

detecting a first selection event associated with a first interactive display element displayed on a first SRP rendered on a first computing device, wherein the first interactive display element is associated with a first search result of the plurality of search results, and wherein the first selection event is associated with a first filtering operation;

storing, based at least in part on the first filtering operation, second session context data in the context data object, wherein the second session context data comprises at least first detail data representative of the first search result;

providing a first input prompt comprising at least the second session context data to a generative model;

storing at least first suggested query response data associated with a first suggested query in a memory cache, wherein the first suggested query response data and the first suggested query are generated by the generative model based on the first input prompt; and causing display of a conversation layer object on the first SRP, wherein the conversation layer object comprises at least a second interactive display element representing the first suggested query and at least a third interactive display element representing the first search result.

6. The computer-implemented method of claim 5, further comprising:

detecting a second selection event associated with the second interactive display element representing the first suggested query;

retrieving, based at least in part on the second selection event, the first suggested query response data generated by the generative model from the memory cache; and causing display of the first suggested query response data in the conversation layer object.

7. The computer-implemented method of claim 6, wherein the first suggested query response data comprises one or more of a search result insight, question answer, or search result comparison associated with the first search result.

8. The computer-implemented method of claim 5, further comprising executing a first update with respect to the context data object based on the first filtering operation, wherein the first update comprises at least removing the first session context data from the context data object.

9. The computer-implemented method of claim 8, further comprising:

detecting a second selection event associated with the third interactive display element representing the first search result, wherein the second selection event is associated with a second filtering operation;

executing a second update with respect to the context data object based on the second filtering operation, wherein the second update comprises at least removing the second session context data from the context data object and causing storage of at least the first session context data in the context data object; and providing a second input prompt comprising at least the first session context data to the generative model.

10. The computer-implemented method of claim 8, further comprising:

detecting a second selection event associated with the third interactive display element representing the first search result;

causing display of a first search result detail page associated with the first search result on the first computing device;

storing, based at least in part on the second selection event, third session context data in the context data object, wherein the third session context data comprises at least first search result detail page data representative of the first search result;

providing a second input prompt comprising at least the third session context data to the generative model;

storing at least second suggested query response data associated with a second suggested query in a memory cache, wherein the second suggested query response data and the second suggested query are generated by the generative model based on the second input prompt; and causing display of the conversation layer object on the first search result detail page, wherein the conversation layer object comprises at least a fourth interactive display element representing the second suggested query, and wherein causing display of the conversation layer object on the first search result detail page comprises at least removing the third interactive display element representing the first search result from the conversation layer object.

11. The computer-implemented method of claim 5, further comprising:

detecting a first text entry event associated with a fourth interactive display element comprised in the conversation layer object;

receiving, based at least in part on the first text entry event, first query data;

determining that a first suggested query response associated with the first query data is not stored in the memory cache;

providing a second input prompt comprising at least the first query data and the second session context data to the generative model;

retrieving first real-time query response data from the generative model, wherein the first real-time query response data is generated based on the second input prompt; and causing display of the first real-time query response data in the conversation layer object.

12. The computer-implemented method of claim 5, further comprising:

prior to detecting the first selection event, providing a second input prompt comprising at least the first session context data to the generative model; and storing at least second suggested query response data associated with a second suggested query in the memory cache, wherein the second suggested query response data and the second suggested query are generated by the generative model based on the second input prompt.

13. The computer-implemented method of claim 5, wherein the first interactive display element is comprised in a first interactive thumbnail object of a plurality of interactive thumbnail objects, wherein the first interactive thumbnail object is associated with the first search result, and wherein the plurality of interactive thumbnail objects is associated with at least the first SRP data.

14. A system comprising:

at least one processor; and non-transitory computer-readable memory storing instructions that, when executed by the at least one processor, are effective to perform operations comprising:

storing first session context data in a context data object, wherein the first session context data comprises at least first search results page (SRP) data representative of a plurality of search results;

detecting a first selection event associated with a first interactive display element displayed on a first SRP rendered on a first computing device, wherein the first interactive display element is associated with a first search result of the plurality of search results, and wherein the first selection event is associated with a first filtering operation;

storing, based at least in part on the first filtering operation, second session context data in the context data object, wherein the second session context data comprises at least first detail data representative of the first search result;

providing a first input prompt comprising at least the second session context data to a generative model;

storing at least first suggested query response data associated with a first suggested query in a memory cache, wherein the first suggested query response data and the first suggested query are generated by the generative model based on the first input prompt; and causing display of a conversation layer object associated with the generative model on the first SRP, wherein the conversation layer object comprises at least a second interactive display element representing the first suggested query and at least a third interactive display element representing the first search result.

15. The system of claim 14, wherein the instructions, when executed by the at least one processor, are further effective to perform operations comprising:

detecting a second selection event associated with the second interactive display element representing the first suggested query;

retrieving, based at least in part on the second selection event, the first suggested query response data generated by the generative model from the memory cache; and causing display of the first suggested query response data in the conversation layer object.

16. The system of claim 15, wherein the first suggested query response data comprises one or more of a search result insight, question answer, or search result comparison associated with the first search result.

17. The system of claim 14, further comprising executing a first update with respect to the context data object based on the first filtering operation, wherein the first update comprises at least removing the first session context data from the context data object.

18. The system of claim 17, wherein the instructions, when executed by the at least one processor, are further effective to perform operations comprising:

detecting a second selection event associated with the third interactive display element representing the first search result, wherein the second selection event is associated with a second filtering operation;

executing a second update with respect to the context data object based on the second filtering operation, wherein the second update comprises at least removing the second session context data from the context data object and causing storage of at least the first session context data in the context data object; and providing a second input prompt comprising at least the first session context data to the generative model.

19. The system of claim 17, wherein the instructions, when executed by the at least one processor, are further effective to perform operations comprising:

detecting a second selection event associated with the third interactive display element representing the first search result;

causing display of a first search result detail page associated with the first search result on the first computing device;

storing, based at least in part on the second selection event, third session context data in the context data object, wherein the third session context data comprises at least first search result detail page data representative of the first search result;

providing a second input prompt comprising at least the third session context data to the generative model;

storing at least second suggested query response data associated with a second suggested query in a memory cache, wherein the second suggested query response data and the second suggested query are generated by the generative model based on the second input prompt; and causing display of the conversation layer object on the first search result detail page, wherein the conversation layer object comprises at least a fourth interactive display element representing the second suggested query, and wherein causing display of the conversation layer object on the first search result detail page comprises at least removing the third interactive display element representing the first search result from the conversation layer object.

20. The system of claim 14, wherein the instructions, when executed by the at least one processor, are further effective to perform operations comprising:

detecting a first text entry event associated with a fourth interactive display element comprised in the conversation layer object;

receiving, based at least in part on the first text entry event, first query data;

determining that a first suggested query response associated with the first query data is not stored in the memory cache;

providing a second input prompt comprising at least the first query data and the second session context data to the generative model;

retrieving first real-time query response data from the generative model, wherein the first real-time query response data is generated based on the second input prompt; and causing display of the first real-time query response data in the conversation layer object.

* * * * *